(12) United States Patent
Neef et al.

(10) Patent No.: US 10,883,456 B2
(45) Date of Patent: Jan. 5, 2021

(54) FILTER ELEMENT WITH RETAINING SURFACES, FILTER WITH A FILTER ELEMENT AND FILTER HOUSING OF A FILTER

(71) Applicant: MANN+HUMMEL GMBH, Ludwigsburg (DE)

(72) Inventors: Pascal Neef, Leonberg (DE); Werner Blossey, Benningen (DE); Mario Rieger, Ludwigsburg (DE); Robert Hasenfratz, Waiblingen (DE); Nadine Donauer, Fellbach (DE); Andreas Weber, Freiberg a. N. (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 673 days.

(21) Appl. No.: 15/587,519

(22) Filed: May 5, 2017

(65) Prior Publication Data
US 2017/0276099 A1 Sep. 28, 2017

Related U.S. Application Data

(63) Continuation of application No. 14/329,957, filed on Jul. 13, 2014, now Pat. No. 9,644,580.

(30) Foreign Application Priority Data

Jul. 12, 2013 (DE) .......................... 10 2013 011 610

(51) Int. Cl.
*F02M 35/024* (2006.01)
*B01D 46/00* (2006.01)

(52) U.S. Cl.
CPC ... *F02M 35/02416* (2013.01); *B01D 46/0002* (2013.01); *B01D 46/0005* (2013.01)

(58) Field of Classification Search
None
See application file for complete search history.

(56) References Cited

U.S. PATENT DOCUMENTS 3,158,458 A * 11/1964 Babbitt ............... B01D 46/523
55/499
3,494,113 A * 2/1970 Kinney ............. B01D 46/0005
55/481

(Continued)

FOREIGN PATENT DOCUMENTS

JP 2008-223485 A 9/2008

*Primary Examiner* — Christopher P Jones
*Assistant Examiner* — Brit E. Anbacht
(74) *Attorney, Agent, or Firm* — James Hasselbeck

(57) ABSTRACT

A filter element (10) is provided with open filter body (16) of a filter medium (18). The filter element (10) has at least one longitudinal mating surface (40) which is directed with at least one direction component axially to an element axis (14) of the filter element (10) and which is in contact with a corresponding longitudinal mating surface of the filter housing (11) for securing the filter element (10) axially to the element axis (14). The filter element (10) has at least one transverse retaining surface (52) which is directed with at least one direction component across the element axis (14). The transverse retaining surface (52) is separated from the at least one longitudinal retaining surface (40) and may be in contact with a corresponding transverse mating surface (56) of the filter housing (11) for securing the filter element (10) across the element axis (14).

10 Claims, 10 Drawing Sheets

(56) References Cited

U.S. PATENT DOCUMENTS

| | | | | |
|---|---|---|---|---|
| 3,789,589 | A * | 2/1974 | Delany | B01D 46/0005 55/481 |
| 3,793,813 | A * | 2/1974 | McAllister | B01D 46/0005 55/481 |
| 4,056,376 | A * | 11/1977 | Schuldenfrei | B01D 46/0005 55/497 |
| 4,728,426 | A * | 3/1988 | Rudinger | B01D 25/26 210/493.3 |
| 4,885,015 | A * | 12/1989 | Goulet | B01D 46/0001 55/497 |
| 4,963,171 | A * | 10/1990 | Osendorf | B01D 46/0005 55/355 |
| 6,238,561 | B1 * | 5/2001 | Liu | B01D 46/0001 210/492 |
| 6,375,700 | B1 * | 4/2002 | Jaroszczyk | B01D 46/10 210/493.2 |
| 7,097,694 | B1 * | 8/2006 | Jaroszczyk | B01D 39/1615 210/493.1 |
| 7,314,558 | B1 * | 1/2008 | Jaroszczyk | B01D 46/0067 210/487 |
| 7,998,259 | B2 * | 8/2011 | Vijayakumar | B01D 53/04 96/134 |
| 8,382,876 | B2 * | 2/2013 | Widerski | B01D 46/0005 55/313 |
| 8,460,420 | B2 * | 6/2013 | Darnell | B01D 46/0005 123/198 E |
| 9,283,507 | B2 * | 3/2016 | Coulonvaux | B01D 46/525 |
| 9,320,997 | B2 * | 4/2016 | Campbell | B01D 46/0005 |
| 2002/0100263 | A1 * | 8/2002 | Jaroszczyk | B01D 46/10 55/482 |
| 2004/0221555 | A1 * | 11/2004 | Engelland | B01D 46/008 55/502 |
| 2007/0045167 | A1 * | 3/2007 | Jaroszczyk | B01D 46/0067 210/337 |
| 2008/0216455 | A1 | 9/2008 | Aizawa et al. | |
| 2010/0078379 | A1 * | 4/2010 | Rocklitz | B01D 25/26 210/493.1 |
| 2011/0186504 | A1 * | 8/2011 | Rocklitz | B01D 46/522 210/493.1 |
| 2011/0233133 | A1 * | 9/2011 | Wacker | B01D 46/002 210/487 |
| 2012/0260616 | A1 | 10/2012 | Leister et al. | |

* cited by examiner

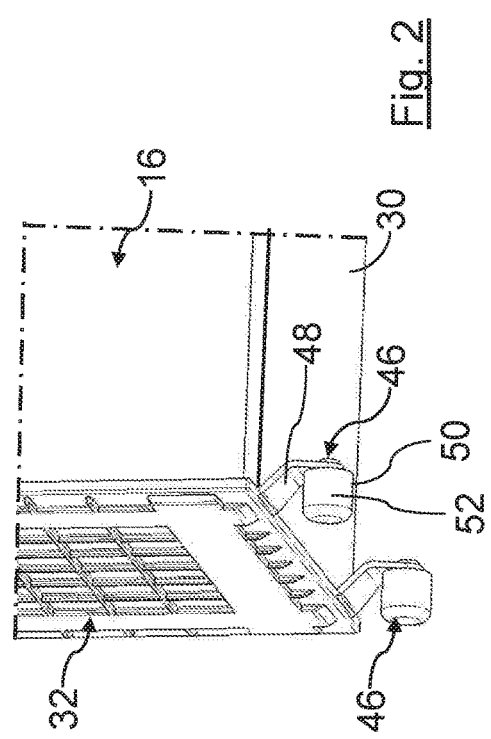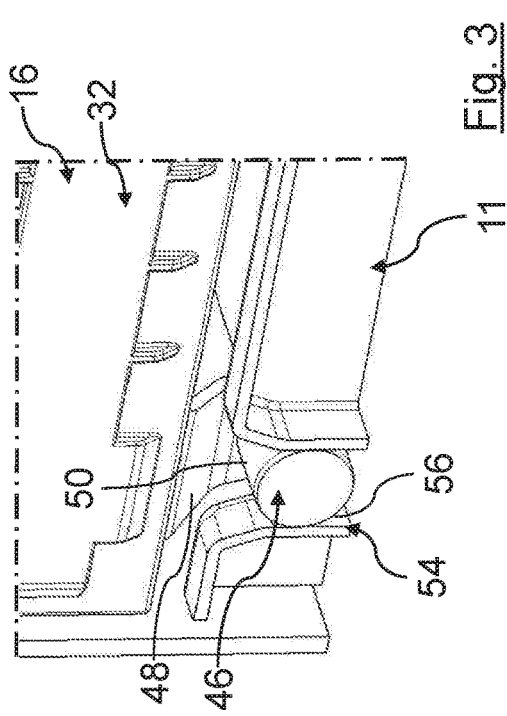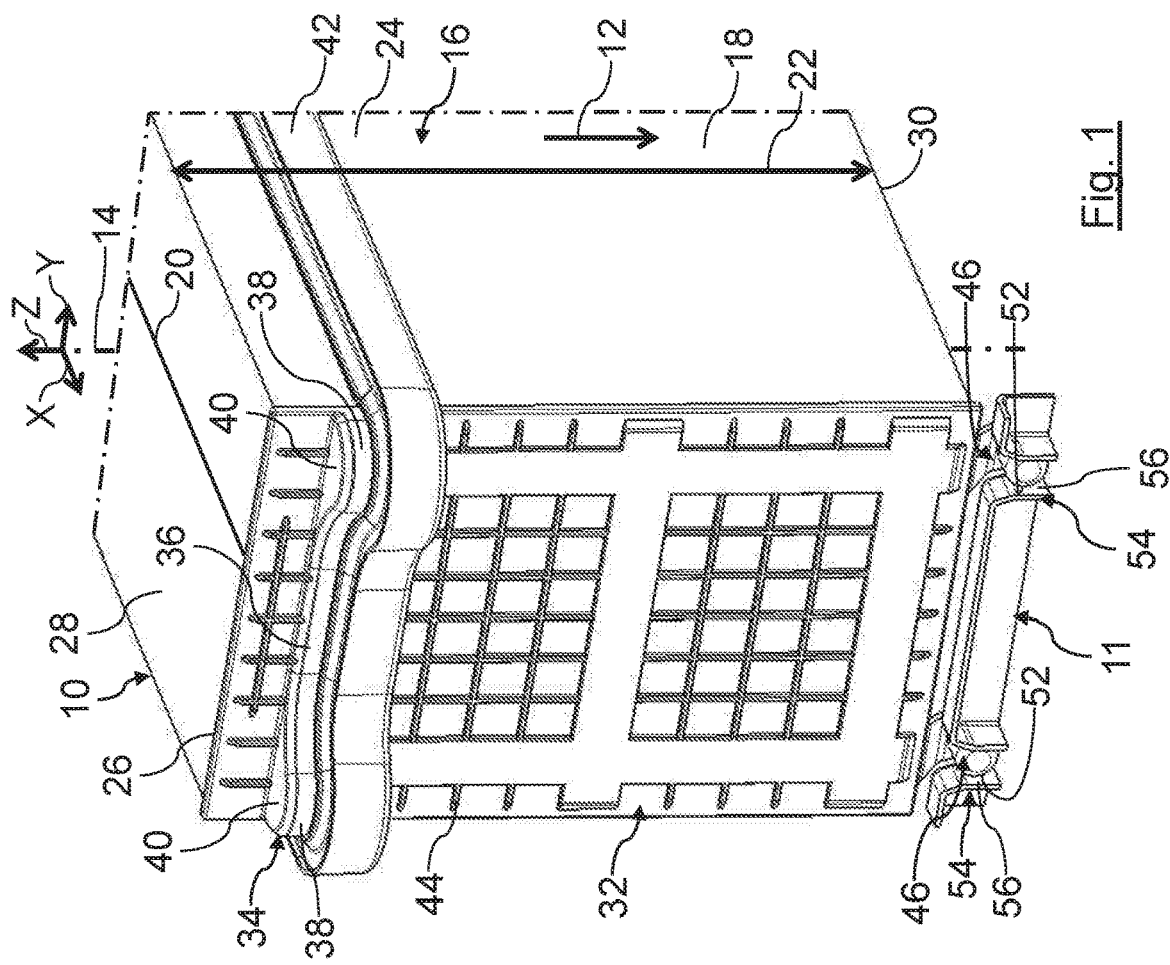

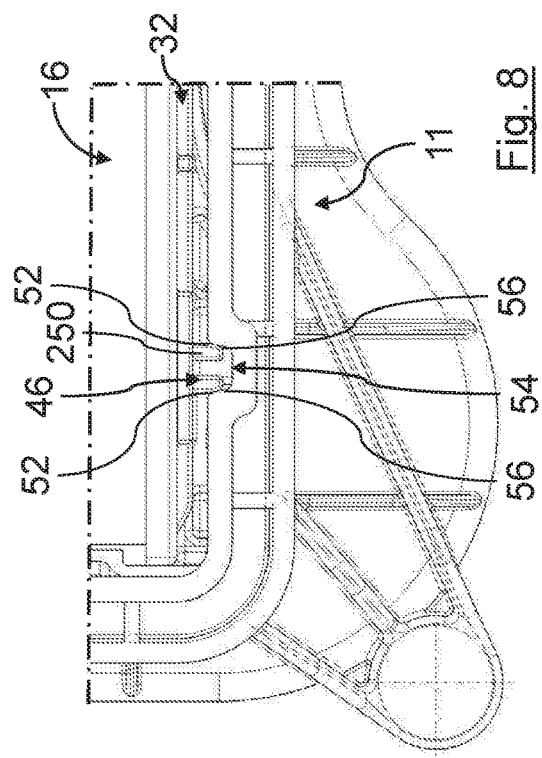
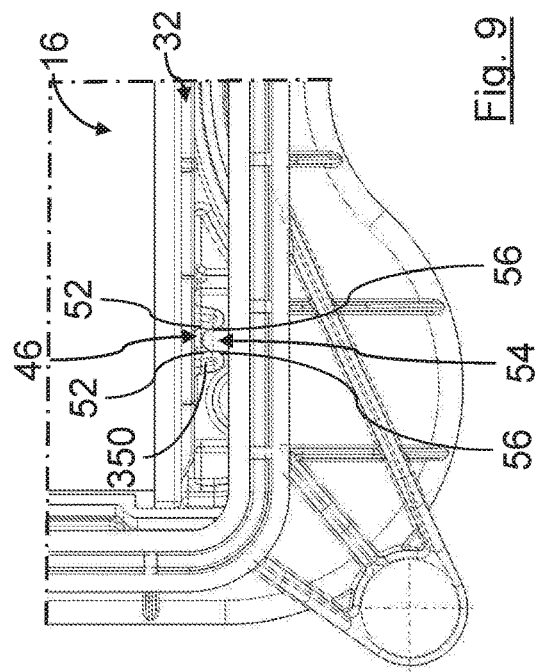
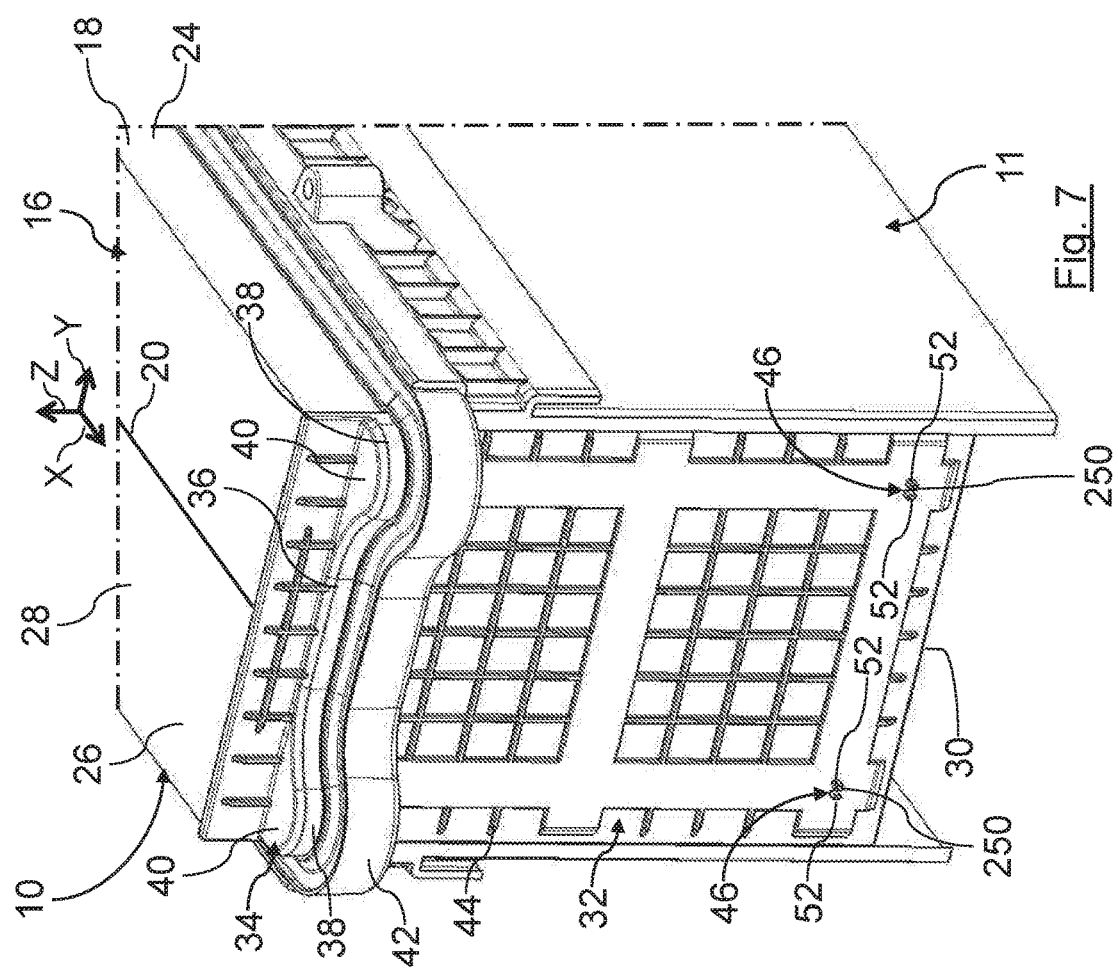

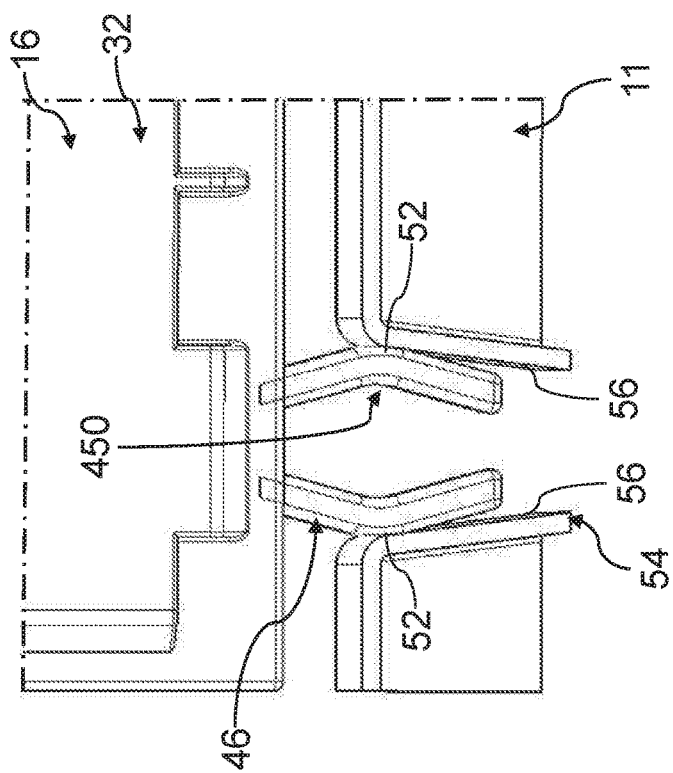
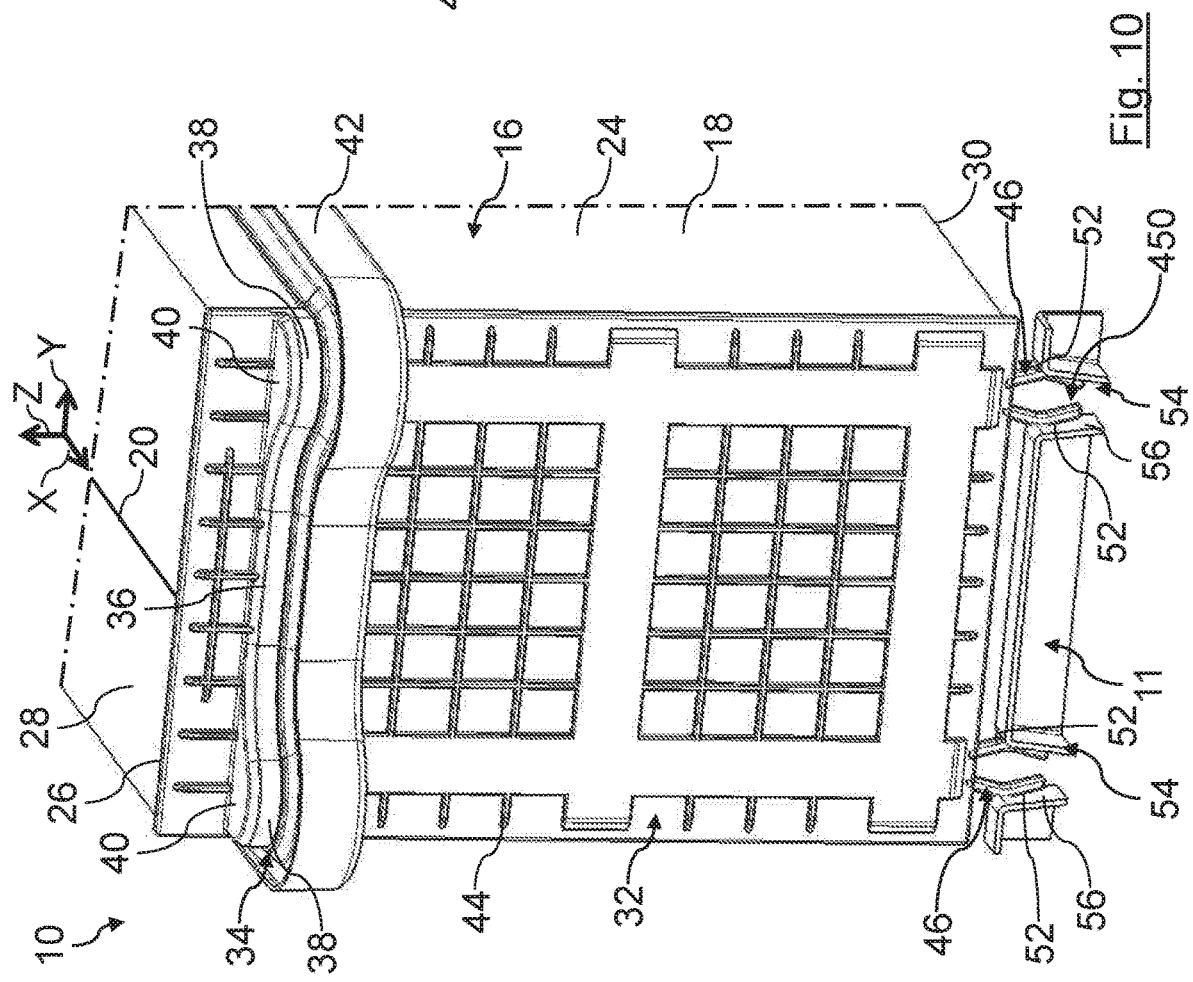

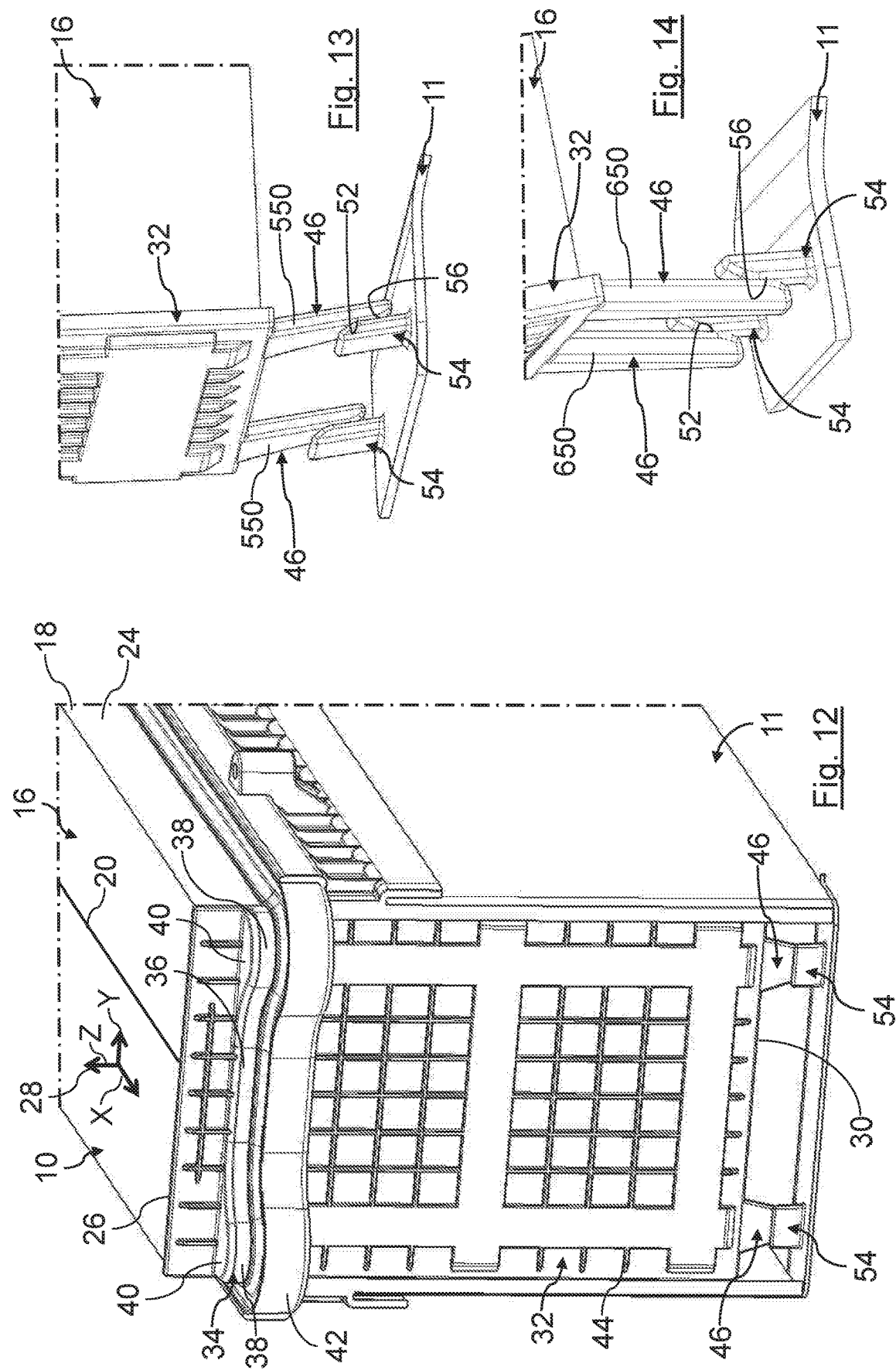

FILTER ELEMENT WITH RETAINING SURFACES, FILTER WITH A FILTER ELEMENT AND FILTER HOUSING OF A FILTER

CROSS-REFERENCE TO RELATED APPLICATION

This application is a Continuation of U.S. application Ser. No. 14/329,957, filed 13 Jul. 2014, which claims priority to German Patent Application No. 10 2013 011 610.4, filed 12 Jul. 2013, the aforesaid German patent application and the US application being incorporated in their entirety herein by reference.

TECHNICAL FIELD

The invention relates to a filter element, in particular a flat filter element for installation in a filter housing of a filter for fluid, in particular an air filter, in particular for an internal combustion engine, in particular for a motor vehicle, with a filter body or an open filter bellows of a filter medium having an oncoming flow side and an outgoing flow side for the fluid to be filtered, wherein the filter element comprises at least one longitudinal retaining surface, which is directed axially to an element axis of the filter element with at least one direction component and can come in contact with a corresponding longitudinal mating surface of the filter housing for retaining the filter element axially to the element axis.

Furthermore, the invention relates to a filter for a fluid, in particular an air filter, in particular for an internal combustion engine, in particular in a motor vehicle, having a filter housing, which has at least one inlet and at least one outlet for fluid and having at least one filter element, in particular a flat filter element, in particular a filter element according to the invention with filter body, in particular a filter body, made of a filter medium having an oncoming flow side and an outgoing flow side for the fluid to be filtered, wherein the filter element is disposed in the filter housing in such a way that it separates at least one inlet from at least one outlet and wherein the filter element comprises at least one longitudinal retaining surface which is directed axially to an element axis of the filter element with at least one direction component and is in contact with a corresponding longitudinal mating surface of the filter housing for retaining the filter element axially to the element axis.

Furthermore, the invention relates to a filter housing of a filter for fluid, in particular a filter according to the invention, in particular an air filter, in particular for an internal combustion engine, in particular in a motor vehicle which has at least one inlet and at least one outlet for fluid, in which a filter element, in particular a filter element according to the invention, in particular a flat filter element can be disposed such that it separates at least one inlet from at least one outlet and wherein the housing axis has at least one longitudinal mating surface with respect to a housing axis, such that this mating surface is directed with at least one direction component axially to the housing axis and can come in contact axially with a corresponding longitudinal retaining surface of the filter element for retaining the filter element axially to the housing axis.

BACKGROUND

WO 2012/175438 A1 describes a filter device with a plate filter element for filtering fresh air for an internal combustion engine of a motor vehicle. The filter element has flat planar plate-shaped filter body, having an edge that is disposed peripherally and laterally as well as encompassing a cross section of the filter body through which the flow can pass. The filter element is disposed in the interior of a filter housing. The filter device is preferably an air filter device for a motor vehicle in particular.

The invention is based on the object of designing a filter element, a filter and a filter housing of the type defined above in which the retention and/or positioning of the filter element in the filter housing can be improved. It should be possible in particular to improve guidance of the filter element during installation in the filter housing, in particular by simplifying it.

SUMMARY OF THE INVENTION

An object of the invention is to provide a filter element, a filter and a filter housing of the type defined above in which the retention and/or positioning of the filter element in the filter housing can be improved. It should be possible in particular to improve guidance of the filter element during installation in the filter housing, in particular by simplifying it.

This object is achieved according to the invention with the filter element by the fact that the filter element comprises at least one transverse retaining surface which is directed transversely to the element axis with at least one direction component, this retaining surface being separate from at least one longitudinal retaining surface and it can be in contact with the corresponding transverse mating surface of the filter housing for retaining the filter element transversely to the element axis.

Thus, according to the invention, multiple retaining surfaces are provided, which can support the filter element in different directions with respect to the filter housing. If an imaginary X-Y-Z coordinate system is on the filter element to facilitate a description, such that the z axis of this coordinate system runs axially to the element axis, then the filter element is supported in the filter housing with at least one longitudinal retaining surface in the direction of the z axis. The filter element is supported with at least one transverse retaining surface transversely to the z axis, in particular in the direction of the x axis and/or in the direction of the y axis.

With at least one retaining surface, the filter element may advantageously be supported radially to the element axis, i.e., radially to the z axis.

At least one transverse retaining surface and/or the corresponding transverse mating surface may advantageously be designed so that the filter element can be supported throughout the entire X-Y plane. The filter element can be supported in all directions transversely to the element axis in this way.

At least one transverse retaining surface may advantageously have a bend about an imaginary axis of bending, which runs essentially parallel to the z axis. The filter element can thus be supported and retained accordingly in the filter housing in different directions in the X-Y plane by means of at least one curved longitudinal retaining surface and at least one transverse retaining surface.

At least one transverse retaining surface and at least one longitudinal retaining surface are separated from one another according to the invention. "Separated" in this context means that the transverse retaining surface and the longitudinal retaining surface are not disposed directly side by side, in particular on a common retaining configuration, but they may be attached in particular to a common end body of the filter element, so that they can be connected to one another mechanically by means of the end body. Due to this separation, at least one transverse retaining surface and at least one longitudinal retaining surface can each be optimized with respect to their direction of support. Optimal transfer of force may therefore occur between the filter element and the filter housing.

Relatively large, in particular bulky and/or heavy, filter elements and/or those that are extensive in at least one direction, in particular in the direction of the z axis, may also be secured and positioned in a stable and reliable manner in the filter housing with this invention. This makes it possible in particular to reliably secure filter elements having pleated filter media, with deep pleats and/or variable pleat heights, in a filter housing.

At least one of the retaining surfaces, in particular a transverse retaining surface and at least one corresponding mating surface of the filter housing may thus advantageously be adapted to one another, so that they can the improve guidance of the filter housing element during installation into and/or dismantling from the filter housing in at least some sections. The positioning of the filter element in the filter housing can thereby be improved. The shape of at least one mating surface of the filter housing may thus advantageously approach a plane parallel to the z axis. Two opposing mating surfaces may advantageously form a funnel-type retaining receptacle for corresponding retaining surfaces of the filter element at least in part. The corresponding, mutually opposite retaining surfaces of the filter element may be inserted easily into the funnel-type retaining receptacle and guided into their end positions. Conversely, two retaining surfaces of the filter element may also surround two mating surfaces of the filter housing with a funnel-type shape accordingly.

At least one longitudinal retaining surface and/or at least one transverse retaining surface may advantageously be designed so that mechanical forces can be transferred reliably between the filter element and the filter housing by means of this surface. In particular at least one retaining surface may be stable accordingly.

At least one longitudinal retaining surface and/or at least one transverse retaining surface may advantageously be designed so that they allow a tolerant installation of the filter element in the filter housing. Then the corresponding at least one retaining surface may permit tolerance guidance and/or positioning and/or tolerant retention. At least one of the retaining surfaces, in particular a transverse retaining surface and/or the corresponding mating surfaces may advantageously have a flexible, in particular elastic design. An optimal guidance and/or positioning and/or retention, in particular in a position-tolerant manner, of the filter element in the filter housing can thus be made possible.

At least one longitudinal retaining surface and/or at least one transverse retaining surface may advantageously be designed in accordance with filter-specific requirements, in particular the required directions of support, directions of load and/or directions of vibration in the filter and/or adapted to one another. Due to the use of multiple retaining surfaces, which can provide support in different directions, the adaptation to the filter-specific requirements can be improved, in particular by simplification and optimization.

At least one longitudinal retaining surface and/or at least one transverse retaining surface may advantageously be designed so that it can implement a damping effect, in particular a vibration damping effect between the filter element and the filter housing. The filter element can be protected in particular from operations-induced vibrations in this way. The service life of the filter element can be increased. Alternatively or additionally, the damping may have a positive effect on any noise production by the filter during operation. The damping may advantageously be achieved by means of flexible, in particular elastic retaining surfaces and/or mating surfaces.

The filter element may advantageously be suitable for filtering air. It may also be provided for filtering other types of fluids, in particular gases or liquids. Thus a corresponding filter element may also be used for filtering fuel, oil, water or urea solution in particular.

The filter element may advantageously be used with an internal combustion engine in a motor vehicle.

The filter element may advantageously be disposed in an air filter of a commercial vehicle, in particular a truck, a bus, a construction site vehicle or an agricultural machine. Such filter elements may be of larger dimensions in comparison with filter elements for passenger vehicles. However, the filter element may also be used in passenger vehicles.

The invention may also be used outside of automotive engineering, in particular in industrial motors. Use of the invention outside of internal combustion engines is also possible, in particular in automotive engineering.

The filter element may advantageously be a flat filter element. The filter element may be flat or curved. The oncoming flow side and/or the outgoing flow side of the filter body may be flat or curved. The filter element may also be box-shaped.

The filter body may be approximately in the shape of a polyhedron, for example. The filter body may advantageously be cube-shaped, cuboid, pyramidal, prismatic, wedge-shaped or the like. It is not necessary for all sides of the filter body to be flat. Some of the sides of the filter body may also be curved. Opposing sides may run in parallel. Alternatively or additionally, they may also run obliquely or be otherwise not parallel to one another.

The element axis of the filter element may advantageously be parallel or axial to the installation direction of the filter element in the filter housing. The housing axis of the filter housing may advantageously be parallel or axial to the element axis and/or the direction of installation of the filter element. The dismantling direction is usually opposite the installation direction. The element axis of the filter element may advantageously be a central axis and/or an axis of symmetry. The element axis may advantageously intersect with the oncoming flow side and the outgoing flow side of the filter element. In the event there is a planar oncoming flow side and/or a planar outgoing flow side, the element axis and/or the installation direction may advantageously run perpendicular to the oncoming flow side and/or the planar outgoing flow side.

The filter medium may be a filter paper, a filter nonwoven, a meltblown nonwoven, a woven fabric or some other type of filter medium suitable for filtering fluid, in particular air. The filter medium may advantageously be pleatable.

Alternatively, the filter body may also comprise a fluid-permeable filter foam, in particular an air-permeable filter foam. The filter body may be implemented as a solid block of such a filter foam.

In an advantageous embodiment, at least one transverse retaining surface with respect to the element axis may be at a distance axially from at least one longitudinal retaining surface with respect to the element axis.

This makes it possible to reduce the risk of tilting of the filter element in the filter housing when being guided in its position and/or during operation of the filter.

In another advantageous embodiment, a position of at least a part of at least one transverse retaining surface may be elastically variable in relation to the filter body in particular.

A flexible restraint and/or guidance, in particular an elastic restraint and/or guidance may be provided in or on the housing by means of at least one transverse retaining surface in this way. This makes it readily possible to equalize the tolerance between the filter element and the housing in particular. Furthermore, vibration damping can be implemented easily in this way.

At least one variable section of at least one transverse retaining surface may advantageously be movable transversely to the element axis with at least one direction component.

A body section, in particular a component or a part having at least one transverse retaining surface may advantageously be variable in its shape and/or position in relation to the filter body in order to change the position and/or shape of at least one section of at least one transverse retaining surface. The body section with at least one transverse retaining surface may advantageously comprise an elastic material or be made of an elastic material.

A section carrying at least one transverse retaining surface may advantageously be made of or comprise a plastic, in particular an elastomer. A resilient effect and/or shape can be implemented easily by using a plastic. A section comprising or carrying the transverse mating surface of the filter housing may also be made of or comprise plastic. A plastic-plastic support can be implemented easily in this way. Such supports can be easily and reliably varied elastically. The section comprising and/or carrying at least one transverse retaining surface and/or the section comprising or carrying the transverse mating surface may advantageously comprise or be made of elastomer. The elasticity of the support can be improved in this way.

At least one plastic element, in particular a foam element, may advantageously be glued to the filter body or optionally at least one end body, which may comprise and/or carry at least one transverse retaining surface. At least one contact element may advantageously act as a support body. In particular at least one plastic element may be a strip. At least one plastic element may advantageously be made of a thixotropic material, in particular polyurethane (PUR).

Alternatively or additionally, the section comprising and/or supporting at least one transverse retaining surface may comprise or be made of metal. This section may advantageously have a resilient effect and/or design.

Flexible and/or spannable and/or movable geometries, which may comprise and/or carry at least one retaining surface, in particular a transverse retaining surface, may advantageously be implemented on the filter element, optionally on an end body of the filter element. Corresponding receptacle geometries, in particular grooves and/or ribs, may advantageously be implemented in and/or on the filter housing. Alternatively, the flexible and/or spannable and/or movable geometries may be on the housing side. The corresponding receptacle geometries may be on the filter element in this case.

In an advantageous embodiment, at least one of the retaining surfaces may be disposed on a corresponding retaining configuration.

At least one of the transverse retaining surfaces may advantageously be disposed on at least one transverse retaining configuration. At least one of the longitudinal retaining surfaces may advantageously be disposed on at least one longitudinal retaining configuration.

At least one retaining configuration, in particular a transverse retaining configuration, may advantageously have a movable section, in particular an elastically movable and/or deformable section. This section may advantageously comprise and/or carry at least one transverse retaining surface.

At least one retaining configuration, in particular a transverse retaining configuration, may be connected to the filter body of the filter element, either directly or indirectly. At least one retaining configuration may advantageously be connected to any end body of the filter element.

A counterpart on the housing side corresponding to at least one retaining configuration, in particular a transverse retaining configuration, for at least one transverse retaining configuration may advantageously be attached to the filter housing.

At least one retaining configuration may advantageously be connected directly or indirectly to the filter body, in particular to an end body, if any, on the filter body or to the filter housing in a materially bonded manner, in particular by means of adhesive bonding, welding and/or injection molding or integral molding and/or in a form-fitting manner, in particular by means of plugging, latching and/or tying and/or in a force-locking manner, in particular by means of clamping.

In another advantageous embodiment, at least one of the transverse retaining surfaces may be situated radially inside an imaginary cylinder with respect to the element axis, whose radial outer peripheral side is defined by the outer perimeter of the filter element in the direction of the element axis, in particular the direction of installation of the filter element in the filter housing, as seen at the height of at least one of the longitudinal retaining surfaces.

This makes it possible to prevent at least one transverse retaining surface from protruding beyond at least one longitudinal retaining surface in the direction of the x axis and/or the y axis. It is possible in this way to achieve the result that the lateral extent of the filter element is not increased further due to at least one transverse retaining surface.

At least one transverse retaining surface may advantageously be disposed in a region of the filter element in which the filter element is wider laterally anyway, in particular radially to the installation direction and/or to the element axis, because of at least one longitudinal retaining configuration.

At least one of the transverse retaining configurations may advantageously be situated radially inside an imaginary cylinder whose radial outer peripheral side is defined by the outside perimeter of the filter element at the height of at least one of the longitudinal retaining configurations.

At least one of the transverse retaining surfaces, as seen in the direction of the element axis, in particular in the installation direction of the filter element in the filter housing, may advantageously be flush with at least one of the longitudinal retaining surfaces, in particular at least one of the longitudinal retaining configurations. "Flush" in the sense of the invention means that a projection of at least one transverse retaining surface in the installation direction, in particular in the direction of the element axis, is situated at least partially, preferably completely inside at least one longitudinal retaining surface, in particular the longitudinal retaining configuration, or vice versa.

In another advantageous embodiment, at least one of the transverse retaining surfaces and at least one of the longitudinal retaining surfaces may be disposed on the same peripheral side of the filter element with respect to the element axis, in particular with respect to the installation direction.

At least one of the transverse retaining surfaces and at least one of the longitudinal retaining surfaces may advantageously be contacted or intersected by a plane that is parallel to the element axis, in particular the installation direction, or contains the element axis, in particular the installation direction.

At least one of the transverse retaining surfaces and at least one of the longitudinal retaining surfaces may advantageously be contacted or intersected by an axis parallel to the element axis.

In another advantageous embodiment, at least one of the transverse retaining surfaces and at least one of the longitudinal retaining surfaces may be disposed in the vicinity of opposite sides, in particular end sides of the filter element, in particular axially with respect to the element axis, in particular the installation direction.

"In the vicinity" in this context means that the distance between the retaining surfaces is much greater than the respective distances between the retaining surfaces and the corresponding sides, in particular the oncoming flow side or the outgoing flow side of the filter element. The retaining surfaces may also be disposed directly next to the corresponding sides of the filter element.

At least one transverse retaining configuration and at least one longitudinal retaining configuration may advantageously be disposed in the vicinity of opposing sides of the filter element.

At least one of the transverse retaining surfaces may advantageously be situated in the vicinity of a front side of the filter element with respect to the direction of installation of the filter element in the filter housing. The front side of the filter element may advantageously be facing a housing bottom of the filter housing. The filter element can easily be secured, guided and/or supported in the region of the housing bottom. The front side of the filter element may advantageously be the outgoing flow side.

At least one of the longitudinal retaining surfaces may advantageously be situated in the vicinity of a rear side of the filter element. The rear side of the filter element may advantageously be the oncoming flow side.

At least two transverse retaining surfaces may advantageously be disposed on the filter element. The filter element can be secured and/or supported in several locations in this way. The filter element can thus be uniformly secured and supported in the filter housing. In particular the filter element can thus be guided uniformly in the filter housing during installation and/or dismantling. The risk of tilting of the filter element during installation or dismantling can be reduced in this way. Even relatively heavy and/or large filter elements can be positioned and secured easily and precisely in the filter housing.

At least two transverse retaining surfaces on opposite sides with respect to a plane through the element axis, in particular the direction of installation, in particular the peripheral sides of the filter element, may advantageously be disposed there. The filter element can be secured and/or supported uniformly on opposing sides in this way.

At least four transverse retaining surfaces may advantageously be disposed so that they are on the periphery of the filter element with respect to the element axis.

Two of the transverse retaining surfaces may advantageously be disposed in pairs.

In another advantageous embodiment, the filter medium may be pleated. The ratio between the active filter area and the design volume of the filter body may be improved by pleating the filter medium.

The filter medium may be pleated in a zigzag configuration to form the filter body. The filter media are not closed in filter elements, in particular flat filter elements having open filter body. In other words, end pleats, like end edges, are not joined together. In contrast with that, with hollow filter elements, in particular round filter elements, the filter media are shaped to form closed filter body, i.e., their end pleats are joined to one another. The end pleats are the two outermost pleats on opposite ends, in particular the longitudinal sides of the filter body. The end edges are the two free edges of the filter medium, which run along the end pleats and border them on the end sides of the filter body. The end edges of the filter body are the two other free edges of the filter body, which extend between the end edges and run according to the pleat in the filter body. The pleated edges are the edges, along which the filter medium is pleated. In cube-shaped filter body pleated in a zigzag pattern, the end edges and the pleated edges are straight and run parallel to one another. The end edges run in a zigzag pattern perpendicular to the end edges of the pleated edges. The end edges each span one end edge of the filter body. With a pleated filter medium, the oncoming flow side of the filter body is spanned by the pleated edges on the oncoming flow side. The outgoing flow side is spanned by the pleated edges of the filter body on the outgoing flow sides.

The filter body may advantageously have deep pleats. With filter body that are approximately cube-shaped, one speaks in particular of deep pleats when the pleat height is approximately at least as great as the extent in the direction of the pleated edges and/or in the direction transversely to the pleated edges.

Varying pleat heights and/or pleat shapes may also be provided within the filter bellows. The pleat heights and/or pleat shapes may vary within at least one of the pleats. Alternatively or additionally, the pleat heights and/or pleat shapes may also vary between the pleats, in particular neighboring pleats. A curved shape of the oncoming flow side and/or of the outgoing flow side may be implemented in this way. The pleat heights at the center of the filter bellows in particular may be smaller than those in the region of the longitudinal sides. Alternatively, the filter bellows may also be graduated by varying the filter heights appropriately. The filter bellows may thus be of different heights in the region of the end side.

In another advantageous embodiment, at least one end body, in particular an end disk, may be disposed on at least one peripheral side of the filter body which extends between the oncoming flow side and the outgoing flow side. The filter body and the entire filter element can be stabilized with at least one end body. Furthermore, the filter body may be sealed in a particularly tight manner with at least one end body on the corresponding side. Furthermore, at least one end body may serve as a connecting element or as a retaining element with which the filter element can be positioned and held in a stable position in the filter housing.

Corresponding end bodies may advantageously be disposed on multiple peripheral sides of the filter body. In this way the stability of the filter element can be further improved.

One end body may advantageously be disposed on each of the opposing peripheral sides of the filter body. The end bodies may advantageously be situated on opposite sides of the filter body with respect to the installation direction of the filter element and/or the axis of the element.

With a pleated filter medium, at least one end body may be situated on an end edge side of the filter body. At least one end body may be connected tightly to the end edge side. At least one end body may tightly seal the end edge side of the filter body in this way.

Each end edge side of the filter body may advantageously be sealed with an end body.

At least one end body may advantageously be an end disk. An end disk is flat in its direction of extent in relation to the other directions of extent. The space required by the end body and thus also the filter element can be reduced as a whole in this way.

At least one end body, in particular the end disk, may be provided with a rib structure, with which the stability of the end body can be increased.

A boundary shape of at least one end body may correspond to a boundary shape of the filter body on the side on which at least one end body is disposed. The shape of the end body may be adapted to a variation in the extent, in particular the height of the filter body, in particular a variation in the pleat heights.

At least one end body may advantageously be made of plastic or comprise plastic. Plastic may be elastic. At least one end body made of plastic may have a mechanically damping effect in particular. Furthermore, plastic can be shaped easily, in particular by being cast or injection molded. The mobility, in particular flexibility of the support can be further improved with an end body made of or comprising plastic.

At least one end body, in particular the end body made of plastic, may advantageously be joined to the filter body in a materially bonded manner, in particular by welding or adhesive bonding, in a form-fitting manner, in particular by means of a plug connection or a latching connection and/or in a force-locking manner, in particular by means of a press-fit connection or a clamp connection or in some other way.

In another advantageous embodiment, at least one of the retaining surfaces may be connected in one piece to at least one end body in particular. At least one retaining surface, in particular a transverse retaining surface, can be manufactured easily together with the corresponding end body in this way, in particular by prefabrication. At least one end body with at least one retaining surface may easily be connected to the filter medium. This may be performed advantageously in one operation.

At least one retaining surface and at least one end body may advantageously be joined to one another in one piece. With a one-piece connection, the stability can be increased. Additional fastening elements or additional assembly steps for joining at least one retaining surface to at least one end body may then be omitted. A corresponding retaining configuration may advantageously be implemented for carrying or comprising at least one retaining surface on at least on end body.

At least one end body may easily and advantageously be made of plastic together with at least one retaining surface, in particular by injection molding or casting.

At least one retaining surface may advantageously be integrated into the end body, in particular the end disk. In this way a space-saving and stable construction can be obtained.

Instead of being in one piece, at least one retaining surface may, as an alternative, be designed as a separate part or may be connected directly or indirectly to the end body on a separate part. The separate part may form the corresponding retaining configuration at least in part. The separate part may advantageously be connected to at least one end body. Alternatively, the separate part may be connected directly to the filter body.

At least one of the transverse retaining surfaces may advantageously be inside a region spanned by a projection of the end body in the direction of element axis, in particular the direction of installation, as seen in the direction of installation. At least one handle element does not have a negative effect on a lateral extent of the filter element in this way. The lateral installation space of the filter element can be reduced in this way.

At least one transverse retaining surface may advantageously be disposed on the outside of at least one end body facing away from the filter body. At least one transverse retaining surface, in particular the transverse retaining configuration, advantageously does not protrude beyond the filter body on the oncoming flow side and the outgoing flow side. The extent of the filter element in the main direction of flow and/or in the direction of the axis of the element and/or in the installation direction can be reduced in this way.

Alternatively, at least one transverse retaining surface may be disposed on a front or rear side of the end body as seen in the direction of the element axis. At least one transverse retaining surface may optionally be disposed on a front or rear edge of the rear disk. At least one transverse retaining surface therefore has little or no effect on the lateral extent of the filter element. The installation space transversely to the element axis can thus be reduced in this way.

A transverse retaining configuration comprising or supporting at least one transverse retaining surface may advantageously protrude at least partially beyond an oncoming flow side or an outgoing flow side of the filter body. At least one transverse retaining configuration may advantageously be situated upstream from the oncoming flow side or downstream from the outgoing flow side in front of or behind the filter body. At least one transverse retaining configuration may advantageously extend approximately parallel to a plane of the filter element in which the element axis is situated.

At least one of the retaining surfaces, in particular a transverse retaining surface may advantageously be disposed on the filter element laterally to the oncoming flow side and/or the outgoing flow side. Covering of the oncoming flow side and/or the outgoing flow side by at least retaining surface can be reduced in this way. Interference in the flow of the filter element can thus be reduced.

In another advantageous embodiment, the filter element may have a filter element holding device which may be connected directly or indirectly to the filter body extending between the oncoming flow side and the outgoing flow side along at least a part of the circumference of the filter body and optionally having at least one retaining configuration that protrudes away from the filter body transversely, in particular radially to an installation direction. The filter element can be secured easily with the filter element holding device in a corresponding counter holding device of the filter housing. The filter element can be positioned easily in the filter housing in this way. Due to the fact that the filter element retaining device extends at least along a portion of the circumference and has retaining configurations that protrude radially to the installation direction, axial positioning and retention in the filter housing are possible with respect to the direction of installation and/or the element axis.

The filter element retaining device may advantageously be connected to at least one end body. The transfer of force from the filter housing to the filter body and vice versa can be improved in this way.

The filter element may advantageously have a seal, which is closed on the periphery with respect to the element axis. The seal may optionally be positioned in or on at least one of the retaining configurations. The seal may advantageously be positioned in or on the filter element retaining device. The seal may advantageously also form the filter element retaining device, at least in part.

In a configuration of at least one longitudinal retaining surface, in particular at least one longitudinal retaining configuration in the region of the end side on at least one end body, in particular the end disk, a sealing line, in particular the seal may run around at least one longitudinal retaining surface, in particular at least one longitudinal retaining configuration on the outside radially with respect to the element axis. The sealing line may advantageously have bulges which correspond to the position of at least one transverse retaining surface, in particular at least one retaining configuration, as seen in the direction of the element axis. These bulges may advantageously also surround the longitudinal retaining surfaces at the same time, in particular the longitudinal retaining configurations.

Furthermore, the object according to the invention is achieved by the fact that the filter element comprises at least one transverse retaining surface, which is directed with at least one direction component transversely to the element axis, this surface being separated from at least one longitudinal retaining surface and possibly being in contact with a corresponding transverse mating surface of the filter housing for retaining the filter element transversely to the element axis.

Accordingly, the advantages and features described above in conjunction with the filter element according to the invention and its advantageous embodiments apply to the filter according to the invention and vice versa.

Furthermore, the object according to the invention is achieved with the filter housing due to the fact that the filter housing comprises at least one transverse mating surface, which is directed transversely to the housing axis with at least one direction component, which is separated from at least one longitudinal mating surface and may be in contact with a corresponding transverse retaining surface of the filter element for retaining the filter element transversely to the housing axis.

BRIEF DESCRIPTION OF THE DRAWINGS

Additional advantages, features and details of the invention are derived from the following description, in which exemplary embodiments of the invention are described in greater detail with reference to the drawings. Those skilled in the art will also expediently consider individually the features that are disclosed in combinations in the drawings, the description and the claims, and will combine them into other appropriate combinations. They show schematically:

FIG. 1 shows an isometric diagram of a detail of an air filter element with an air filter element according to a first exemplary embodiment, with end disks on opposing peripheral sides on which two transverse retaining cylinders which enter into corresponding transverse retaining receptacles on the filter housing and two longitudinal retaining configurations are disposed;

FIG. 2 shows a detail view of the filter element from FIG. 1 in the region of the transverse retaining cylinders;

FIG. 3 shows a detail view of the air filter from FIG. 1 in the region of one of the transverse retaining cylinders and the corresponding transverse retaining receptacle;

FIG. 7 shows an isometric diagram of a detail of an air filter with an air filter element according to a third exemplary embodiment, with two lateral transverse retaining forks;

FIG. 8 shows a detail of a cross section of the air filter from FIG. 7 in the region of one of the transverse retaining forks which enters into a corresponding transverse retaining receptacle on the filter housing transversely to the installation direction of the filter element;

FIG. 9 shows a detail of a cross section of an air filter with an air filter element according to fourth exemplary embodiment in the region of an alternative lateral transverse retaining fork, which surrounds and grips a corresponding alternative transverse retaining receptacle on the filter housing transversely to the installation direction;

FIG. 10 shows an isometric diagram of a detail of an air filter with an air filter element according to a fifth exemplary embodiment, with two lower transverse retaining forks which enter into corresponding transverse retaining receptacles on the filter housing in the installation direction;

FIG. 11 shows a detail view of one of the transverse retaining forks and the corresponding retaining receptacle from FIG. 10;

FIG. 12 shows an isometric diagram of a detail of an air filter with an air filter element according to a sixth exemplary embodiment, with two transverse retaining straps which are in contact with corresponding transverse retaining receptacles on the filter housing;

FIG. 13 shows a detail view of one of the transverse retaining straps on the corresponding retaining receptacle from FIG. 12;

FIG. 14 shows an isometric detail diagram of an air filter with an air filter element according to a seventh exemplary embodiment which is similar to the air filter from FIGS. 12 and 13, in the region of two alternative transverse retaining straps and the corresponding alternative transverse retaining receptacles;

The same parts in the figures are labeled with the same reference numerals.

DETAILED DESCRIPTION OF THE INVENTION

Figure 5:
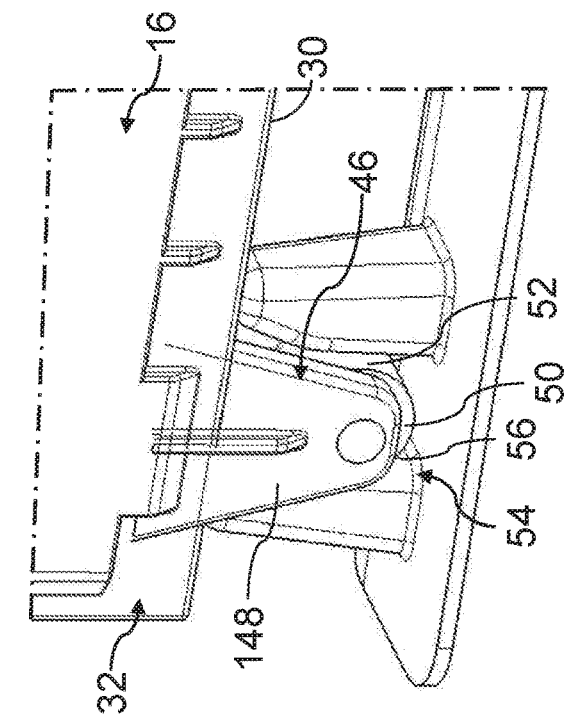
FIG. 5 shows an isometric detail view of the air filter from FIG. 4 in the region of one of the transverse retaining cylinders and the corresponding transverse retaining receptacles.

FIGS. 1 to 3 show a detail of an air filter of an internal combustion engine of a motor vehicle according to a first exemplary embodiment in different perspectives. The air filter comprises a filter element 10, which is disposed in a filter housing 11 that can be opened, so that the filter element can be replaced, and it separates an air inlet of the filter housing 11 from an air outlet. The filter housing 11 is assembled from a housing pot and a housing cover. FIGS. 1 and 3 show only a detail of the housing pot of the filter housing 11, as described further below. The air filter serves to filter combustion air, which is supplied for operation of the internal combustion engine.

The installation direction 12 of the filter element 10 in the housing pot runs parallel to an element axis 14 in the exemplary embodiment shown here. One housing axis of the filter housing 11, which is not shown here to facilitate understanding, runs coaxially with the element axis 14. The element axis 14, for example, runs parallel to the z axis of an X-Y-Z coordinate system, which is shown in FIG. 1 to simply the description.

The filter element 10 can be inserted into the housing pot through an installation opening.

The filter element 10 is designed as a flat filter element. The filter element 10 comprises filter body 16 made of a filter medium 18 pleated in a zigzag pattern, the body being approximately cube-shaped on the outside. The filter medium 18 may be filter paper, filter nonwoven or some other pleatable filter medium suitable for filtering air. The filter body 16 may also be made of an unpleated filter medium, for example, a filter foam. The filter medium 18 is pleated along pleated edges 20. The pleated edges 20 run parallel to one another and perpendicular to the element axis 14. The pleat edges 20, for example, run parallel to an x axis of the X-Y-Z coordinate system.

FIGS. 1 and 2 show at the top, for example, one of the pleat edges 20 on the oncoming flow side. The pleat heights 22 of the pleated filter medium 18 extend parallel to the element axis 14, i.e., in the direction of the z axis. The axial height of the filter body 16 in the direction of the z axis with respect to the element axis 14 is greater than the width of the filter body 16 in the direction of the y axis. Therefore these pleats can be described as deep.

End edge sides 26 of the filter body 16 are spanned by end edges of the filter medium 18 which are concealed in FIGS. 1 and 2. The end edges of the filter medium 18 have an approximate zigzag shape. The end edge sides 26 are situated on radially opposite sides with respect to the element axis 14. The end edge sides 26 run parallel to one another and perpendicular to an oncoming flow side 28 and an outgoing flow side 30. The oncoming flow side 28 and the outgoing flow side 30 are each spanned by the element axis 14 and the pleat edges 20 on the oncoming flow side and/or the outgoing flow side respectively. The end edge sides 26 connect two opposing longitudinal sides 24 of the filter body 16 that are parallel to an X-Z plane and form with them the periphery of the filter body 16.

The oncoming flow side 28, shown at the top of FIG. 1, is on the side facing the housing cover when the filter element 10 is installed.

The outgoing flow side 30, shown at the bottom of FIGS. 1 to 3, is situated on the side facing the pot bottom of the housing pot.

During operation of the filter element 10, the flow of air passes through the filter body 16 according to the present exemplary embodiment from the oncoming flow side 28 to the outgoing flow side 30. A main direction of flow of the air through filter body 16 runs parallel to the installation direction 12 and to the element axis 14 in the present example. The flow can thus also pass through the filter body 16 in the opposite direction. In this case, the terms "oncoming flow side' and "outgoing flow side" are reversed.

An end disk 32 is tightly connected to the end edges of the filter element 18 on the end edge sides 26 of the filter body 16. The end disks 32 are each made of plastic. The end disks 32 are approximately rectangular on the outside.

In the vicinity of its border on the oncoming flow side, each end disk 32 has a longitudinal filter element retaining device 34. This filter element retaining device 34 comprises a one-piece protrusion 36. The protrusion 36 extends peripherally with respect to the element axis 14. It extends outward from the filter body 16, as seen in the direction of the pleat edges 20, and approximately parallel to the border of the end disk 32 on the oncoming flow side.

In the region of their ends, each of which faces the longitudinal sides 24, the protrusions 36 each have an outwardly protruding longitudinal retaining configuration 38, as seen from the filter body 16. The longitudinal retaining configurations 38 each have a longitudinal retaining surface 40 on their side facing the oncoming flow side 28 and their side facing the outgoing flow side 30. The longitudinal retaining surfaces 40 each extend approximately parallel to the X-Y plane.

With the help of the longitudinal filter element retaining device 34, the filter element 10 can be secured axially in the filter housing, i.e., longitudinally with respect to the installation direction 12 and the element axis 14. The filter housing 11 therefore has corresponding longitudinal mating surfaces (not shown in FIGS. 1 to 3) for the longitudinal filter element retaining device 34.

A seal 42 which is designed as a profiled seal surrounds the filter body 16 and the end disks 32 and/or the protrusions 36 and the longitudinal retaining configurations 38 are closed peripherally with respect to the element axis 14. It is situated somewhat behind the pleat edges 20 on the oncoming flow side as seen from the oncoming flow side 28.

Furthermore, the end disks 32 are each provided with reinforcing ribs 44, which run in a grid pattern on their outsides facing away from the filter body 16.

Two transverse retaining configurations 46 are disposed on the respective borders of the end disks 32 on the outgoing flow side facing the outgoing flow side 30. The transverse retaining configurations 46 are situated laterally in the vicinity of the respective longitudinal side 24. The transverse retaining configurations 46 are each intersected by an imaginary plane, which is parallel to the X-Z plane running through the corresponding longitudinal retaining configuration 38 which is situated next to the same longitudinal side 24. The transverse retaining configurations 46 are situated on opposite sides of the filter element 10 with respect to the X-Z plane. The transverse retaining configurations 46 of the two end disks 32 are situated on opposite sites of the filter element 10 with respect to the Y-Z plane. The transverse retaining configurations 46 protrude beyond the filter body 16 on the oncoming flow side 28.

The transverse retaining configurations 46, shown in detail in FIG. 2, each have a retaining arm 48 and a retaining cylinder 50. The retaining arm 48 and the retaining cylinder 50 are each made of an elastic plastic. The retaining arm 48 is connected in one piece to the border of the end disk 32 on the outgoing closed side. It is curved in the direction of the x axis toward the filter body 16 in a section facing the border of the end disk 32. It thus extends into region of the outgoing flow side 30. On its free end, the retaining arm 48 has a bolt section with an axis running parallel to the x axis. The retaining cylinder 50, which is therefore hollow on the inside, is attached to the bolt section. The imaginary axis of the retaining cylinder 50 extends parallel to the x axis. The opposing peripheral sides of the retaining cylinder 50 which are on the outside radially and run tangentially to corresponding imaginary planes parallel to the X-Z plane, form transverse retaining surfaces 52 of the transverse retaining configurations 46.

The transverse retaining configurations 46 with the transverse retaining service 52 are situated radially inside an imaginary cylinder with respect to the element axis 14 and the installation direction 12, such that the peripheral side on the outside radially is defined by the outer perimeter of the filter element 10 in the direction of the element axis 14 and the installation direction 12, as seen at the height of the longitudinal retaining surfaces 40.

The filter housing 11 has a total of four transverse retaining receptacles 54 for receiving the retaining cylinders 50. FIGS. 1 and 3 show as examples two and one, respectively, of the transverse retaining receptacles 54. The transverse retaining receptacles 54 are recesses with a straight U-shaped profile as seen in the direction of the x axis. The open side of the "U" is situated on the side facing the installation opening of the filter housing 11. Transverse retaining receptacles 54 there each open in a funnel shape. An imaginary longitudinal axis of the respective U-shaped profile runs parallel to the x axis. The U-shaped profiles are each open on one side which faces an interior of the filter housing 11 with respect the x axis. The insides of the side walls of the transverse retaining receptacles 54 which face one another and correspond to the vertical legs of the "U" each formed transverse mating surfaces 56.

A distance in the direction of the z axis between the longitudinal mating surface of the filter housing 11 with which the longitudinal retaining surface on the outgoing flow side of the longitudinal retaining configuration 38 of the filter element 10 (not shown in the figures) can be in contact, and the center of the respective transverse mating surface 56, as seen in the direction of the z axis, on the same longitudinal side 24 corresponds to a distance between the longitudinal retaining surface on the outgoing flow side and the center of the respective transverse retaining surfaces 52 of the corresponding retaining cylinder 50, as seen in the direction of the z axis.

For installation in the filter housing 11, the filter element 10 is inserted through the installation opening into the housing pot with the outgoing flow side 30 at the front. As soon as the retaining cylinders 50 are at the entrances to the respective transverse retaining receptacles 54, the retaining cylinders 50 are guided through the final shape into the transverse retaining receptacles 54. The filter element 10 is guided by means of the transverse retaining configurations 46 and the transverse retaining receptacles 54 in the direction of the y axis, i.e., transversely with respect to the z axis, i.e., the direction of installation 12. However, there is no guidance in the direction of the x axis, so that in this direction there can be a position-tolerant installation.

Further movement of the filter element 10 in the installation direction 12 is stopped as soon as the longitudinal retaining surfaces of the longitudinal retaining configurations 38 of the filter element 10 on the outgoing flow side are in contact with the corresponding longitudinal mating surfaces of the filter pot. The longitudinal mating surfaces form an axial stop, i.e., a longitudinal stop, with respect to the z axis.

The transverse retaining surfaces 54 of the retaining cylinders 50 are situated approximately centrally on the respective transverse mating surfaces 56 of the transverse retaining receptacles 54 in this position of the filter element 10, as seen in the z axis. The transverse retaining surfaces 54 are supported on the respective transverse mating surfaces in the direction of the y axis. The transverse retaining surfaces 54 and the transverse mating surfaces 56 form a stop across, i.e., transversely to, the z axis and to the installation direction 12.

In the direction of the z axis and in the direction of the x axis, the transverse retaining surfaces 54 and the transverse mating surfaces 56 are able to move relative to one another. The positioning of the filter element 10 on the sides of the transverse retaining configurations 56 is therefore positioned tolerant in the direction of the z axis and in the direction of the x axis. Due to the elasticity of the retaining cylinders 50, a certain position tolerance is achieved in the direction of the y axis.

Next the housing cover is placed on the housing pot and the filter housing 11 is closed. The housing cover comprises longitudinal mating surfaces on the oncoming flow side which correspond to the longitudinal retaining surfaces 40 of the filter element 10 on the oncoming flow side and are in contact with them when the housing cover is assembled. The longitudinal retaining configurations 38 and thus the filter element 10 are secured longitudinally with respect to the z axis between the respective longitudinal mating surfaces on the oncoming closed side and the longitudinal mating surfaces on the outgoing flow side.

Tilting and vibration of the filter element 10 in the filter housing 11 are prevented or at least reduced by securing the filter element 10 with the longitudinal filter element retaining device 34 on the oncoming flow side as well as with the transverse retaining configurations 46 on opposite sides on the outgoing flow side.

Figure 6:
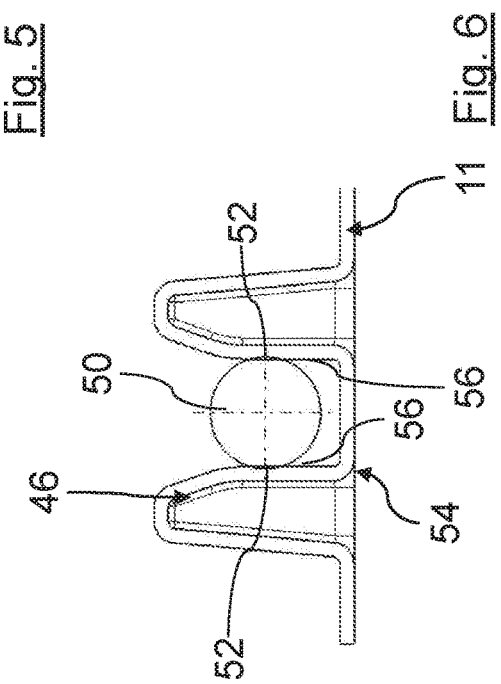
FIG. 6 shows a section through the transverse retaining cylinder and the corresponding retaining receptacle from FIG. 5.
Figure 4:
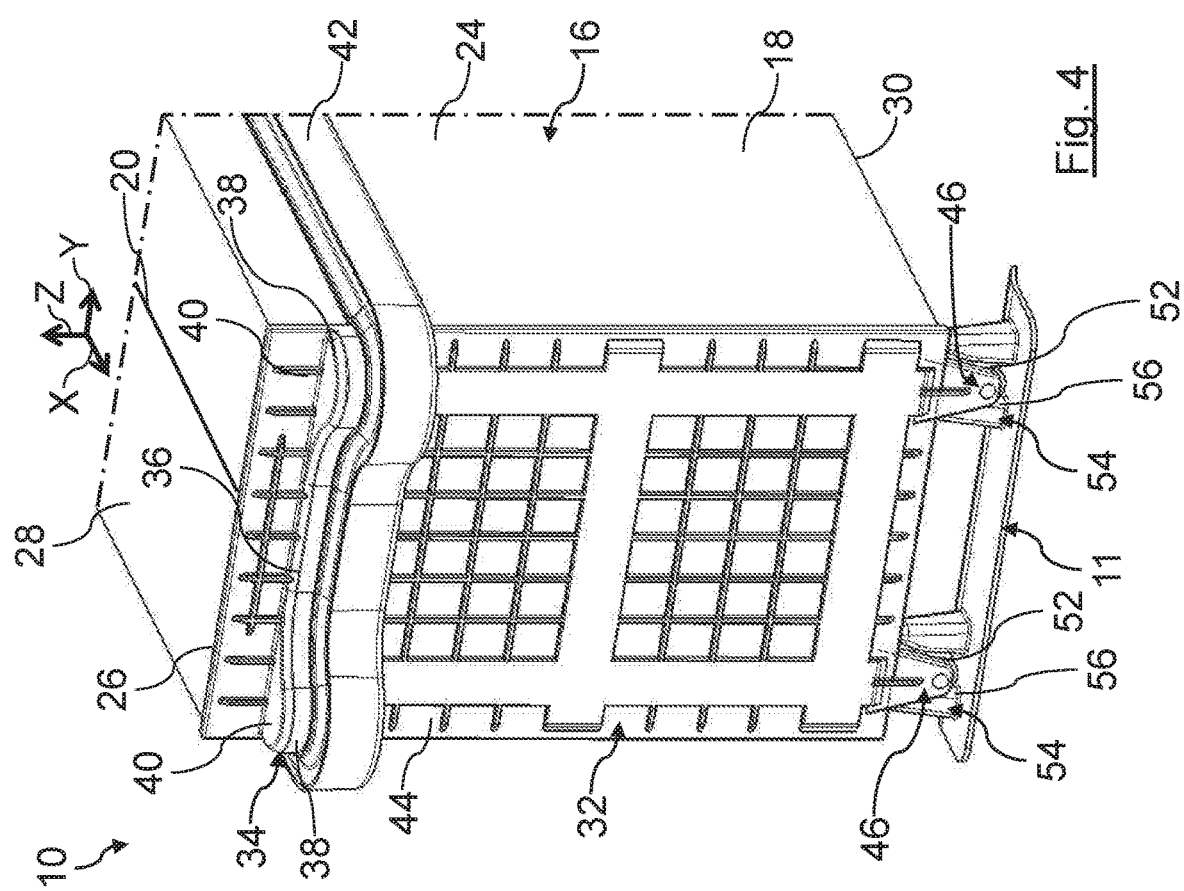
FIG. 4 shows an isometric diagram of a detail of an air filter with an air filter element according to a first exemplary embodiment, with two alternative transverse retaining cylinders and a corresponding alternative transfer retaining receptacles.

FIGS. 4 through 6 show an air filter with a filter element 10 according to a second exemplary embodiment. In contrast with the first exemplary embodiment in FIGS. 1 to 3, in the second exemplary embodiment the transverse retaining cylinders 50 are disposed between two retaining arms 148 instead of being on one retaining arm 48. The two retaining arms 148 are connected in one piece to the end disk 32. The bolt section on which the retaining cylinder 50 is situated extends between the two retaining arms 148. The transverse retaining configurations 46 do not protrude into the region of the outgoing flow side 30.

The transverse retaining receptacles 54 on the housing side are each implemented between two domes. The domes each extend in the direction of the z axis toward the installation opening of the filter housing 11. The transverse mating surfaces 56 are situated on the sides of the dome facing the other dome. The transverse mating surfaces 56 are each facing in the direction of the y axis.

The filter element 10 is supported against the filter housing 11 with the transverse retaining configurations 46 in the direction of the y axis.

FIGS. 7 and 8 show an air filter with a filter element 10 according to a third exemplary embodiment. In contrast with the first exemplary embodiment, the transverse retaining configurations 46 in the third exemplary embodiment each have a retaining fork 250 instead of retaining cylinders 50. The retaining forks 250 are situated in the vicinity of the border of the end disk 32 on the outgoing flow side on the outside facing away from the filter body 16. The retaining forks 250 are flush with one of the longitudinal retaining configurations 38 as seen in the direction of the z axis.

Each of the retaining forces 250 has two legs whose centers are disposed in a plane parallel to the X-Y plane. The legs each extend outward from the outside of the end disk 32 facing away from the filter body 16 in the direction of the x axis. The legs are elastically flexible in the direction of the y axis, i.e., transversely. The oxides of the legs facing away from the other leg in the direction of the y axis each form one of the transverse retaining surfaces 52. The transverse retaining surfaces 52 are facing in the direction of the y axis.

The corresponding transverse retaining receptacles 54 on the sides of the filter housing 11 are implemented as U-shaped bulges in a peripheral wall of the filter pot facing the corresponding end disk 32. The side walls of the U-shaped bulge, which correspond to the legs of the "U" and form the transverse mating surfaces 58, each extend approximately in a plane parallel to the X-Z plane. The opening in the "U" is situated on the side facing the end disk 32. The transverse mating surfaces 56 are each directed in the direction of the y axis.

With the filter element 10 assembled, the legs of the retaining forks 250 are inserted into the corresponding transverse retaining receptacles 54. The transverse retaining surfaces 52 of the retaining forks 250 are each in contact with one of the transverse mating surfaces 56 of the transverse retaining receptacles 54.

The filter element 10 is supported against the filter housing 11 with the transverse retaining configurations 46 in the direction of the y axis.

FIG. 9 shows an air filter with a filter element 10 according to a fourth exemplary embodiment. In contrast with the third exemplary embodiment shown in FIGS. 7 and 8, the transverse retaining surfaces 52 in the fourth exemplary embodiment are situated on the sides of the legs of the retaining forks 350 facing the respective other legs.

Instead of a bulge, the corresponding transverse retaining receptacles 54 each have an elastic retaining web on sides of the filter housing 11. The retaining webs extend toward the interior of the filter housing 11 approximately in a plane parallel to the X-Z plane. The transverse mating surfaces 56 are situated on the opposite outsides of the retaining webs, as seen in the direction of the y axis. The transverse mating surfaces 56 face in the direction of the y axis.

With the filter element 10 assembled, the legs of the retaining forks 350 each extend around the corresponding retaining web of the transverse retaining receptacles 54. The transverse retaining surfaces 52 of the retaining forks 350 are each in contact with one of the transverse mating surfaces 56 of the transverse retaining receptacles 54.

The filter element 10 is supported against the filter housing 11 with the transverse retaining configurations 46 in the direction of the y axis.

FIGS. 10 and 11 show an air filter with a filter element 10 according to a fifth exemplary embodiment. In contrast with the first exemplary embodiment in FIGS. 1 and 3, the transverse retaining configurations 46 each have a retaining fork 450. The retaining forks 450 are each connected in one piece to the order of the end disk 32 on the outgoing flow side. Each retaining fork 450 has two legs which extend essentially in the direction of the z axis away from the border on the outgoing flow side. The legs of the retaining forks 450 are elastically resilient in the direction of the y axis. Each leg has a bend so that the retaining forks 450 each have a bulging shape on their opposite outer side in the direction of the y axis. These outer sides of the legs form the transverse retaining surfaces 52 of the transverse retaining configurations 46. The transverse retaining surfaces 52 are directed approximately in the direction of the y axis.

The transverse retaining receptacles 54 are implemented in the same way as the transverse retaining receptacles 54 in the first exemplary embodiment in FIGS. 1 to 3.

With the filter element 10 assembled, the legs of the retaining forks 450 are inserted into the corresponding transverse retaining receptacles 54. Then each of the transverse retaining surfaces 52 of the retaining fork 450 is in contact with one of the transverse mating surfaces 56 of the transverse retaining receptacles 54.

The filter element 10 is supported against the filter housing 11 together with the transverse retaining configurations 46 in the direction of the y axis.

FIGS. 12 and 13 show an air filter with a filter element 10 according to a sixth exemplary embodiment. In contrast with the fifth exemplary embodiment in FIGS. 10 and 11, each of the transverse retaining configurations 46 has a retaining strap 550 instead of the retaining forks 450. The retaining straps 550 are each connected in one piece to the border of the end disk 32 on the outgoing flow side. They are situated approximately in the extension of the end disk 32, as seen in the direction of the z axis. The retaining straps 550 are elastically resilient in the direction of the x axis. The transverse retaining surfaces 52 are each situated on the outside of the filter element 10 facing away from the filter body 16.

In contrast with the previous exemplary embodiment, the transverse retaining surfaces 52 face approximately in the direction of the x axis.

The corresponding transverse retaining receptacles 54 on the side of the filter housing 11 are implemented by corresponding retaining straps, which extend from the bottom of the housing pot in a plane approximately parallel to the Y-Z plane, toward the installation opening in the direction of the z axis. The corresponding transverse mating surfaces 56 are situated on the sides of the receiving straps, facing the interior of the filter housing. The transverse mating surfaces 56 are directed essentially in the direction of the x axis. In the region of their ends facing the installation opening, the receiving straps are beveled on their sides which have the respective transverse mating surface 56. The bevels serve as a guide for the transverse retaining surfaces 52 of the transverse retaining configurations 46 of the filter element 10 during installation of the filter element 10.

During installation of the filter element 10, the retaining straps 550 slide on the inside of the corresponding receiving straps of the transverse retaining receptacles 54, where the inside is facing the element axis 14. In the end position, the transverse retaining surfaces 52 of the retaining straps 550 are each in contact with one of the transverse mating surfaces 56 of the transverse retaining receptacles 54.

The filter element 10 is supported against the filter housing 11 with the transverse retaining configurations 46 in the direction of the x axis.

FIG. 14 shows a seventh exemplary embodiment of a filter element 10. In contrast with the sixth exemplary embodiment in FIGS. 12 and 13, the transverse retaining surfaces 52 in the seventh exemplary embodiment are situated on the insides of the retaining straps 550 facing the element axis 14. Accordingly, the transverse mating surfaces 56 are situated on the outsides of the receiving straps of the transverse retaining receptacles 54.

During installation of the filter element 10, the retaining straps 550 slide on the outside of the receiving straps of the transverse retaining receptacles 54. In the end position, the transverse retaining surfaces 52 of the retaining straps 550 are each in contact with one of the transverse mating surfaces 56 of the transverse retaining receptacles 54.

The filter element 10 is supported on the filter housing 11 together with the transverse retaining configurations 46 in the direction of the x axis.

Figure 16:
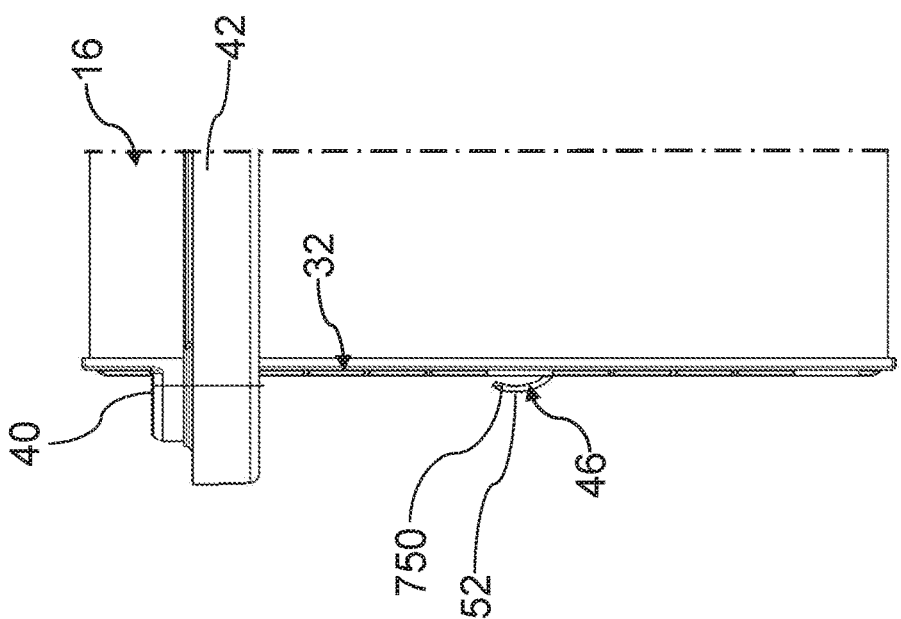
FIG. 16 shows a side view of the detail of the filter element from FIG. 15.
Figure 15:
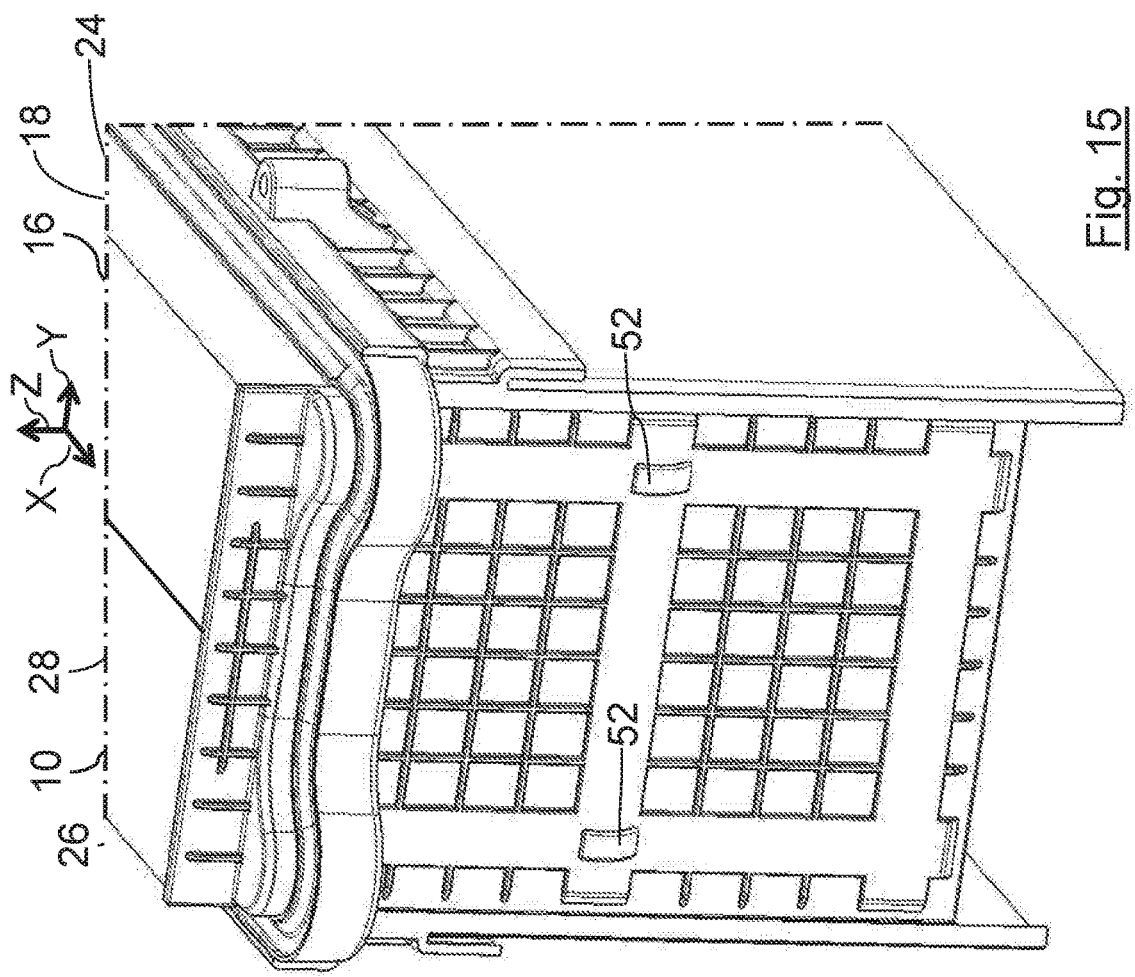
FIG. 15 shows an isometric diagram of a detail of an air filter with an air filter element according to an eighth exemplary embodiment, with two transverse retaining spring arms which are disposed approximately centrally on the end disks as seen in the direction of installation and extend essentially axially to the installation direction.

FIGS. 15 and 16 show an air filter with a filter element 10 according to an eighth exemplary embodiment. In contrast with the first exemplary embodiment, in the eighth exemplary embodiment, the transverse retaining configurations 46 each have a retaining spring arms 750. The retaining spring arms 750 are situated approximately centrally between the border on the oncoming flow side and the border of the end disk 32 on the outgoing flow side, as seen in the direction of the z axis, on the outside facing away from the filter body 16. The retaining spring arms 750 are flush with one of the longitudinal retaining configurations 38 as seen in the direction of the z axis. The retaining spring arms 750 are each elastically resilient in the direction of the x axis, i.e., across or transversely to the z axis. The retaining spring arms 750 are each connected in one piece to the end disk 32 on one end facing the border on the outgoing flow side. The retaining spring arms 750 point obliquely outward from the end disk 32 away from the filter body 16 to the corresponding longitudinal retaining configuration 38, which is situated next to the same longitudinal side 24 of the filter element 10. The retaining spring arms 750 each have a convex curvature, as seen from the outside in the direction of the x axis toward the filter body. An imaginary axis of bending runs parallel to the y axis.

The outsides of the retaining spring arms 750 facing away from the filter body 16 in the direction of the x axis each form a transverse retaining surface 52. The transverse retaining surfaces 52 are directed in the direction of the x axis.

The corresponding transverse retaining receptacles which are not shown in FIGS. 15 and 16, on the sides of the filter housing 11 have corresponding transverse mating surfaces, which are directed essentially in the direction of the x axis.

With the filter element 10 assembled, the retaining spring arms 750 grip the corresponding transverse retaining receptacles resiliently. The transverse retaining surfaces 52 of the retaining spring arms 750 are each in contact with one or the transverse mating surfaces of the transverse retaining receptacles. The transverse retaining surfaces 52 press with the spring force of the retaining spring arms 750 against the corresponding transverse mating surfaces in the direction of the x axis. The filter element 10 is positioned and held there in the direction of the x axis. The transverse retaining surfaces 52 and the transverse mating surfaces can be moved relative to one another in the Y-Z plane. The tension and/or guidance of the filter element 10 by means of the transverse retaining configurations 46 thus has position tolerance in the direction of the z axis and in the direction of the y axis.

Figure 18:
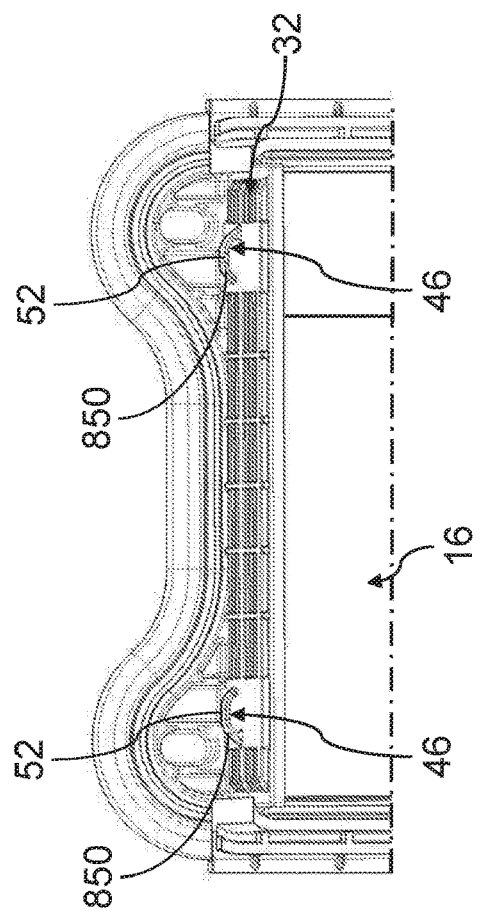
FIG. 18 shows a bottom view of the detail of the filter element in FIG. 17.
Figure 17:
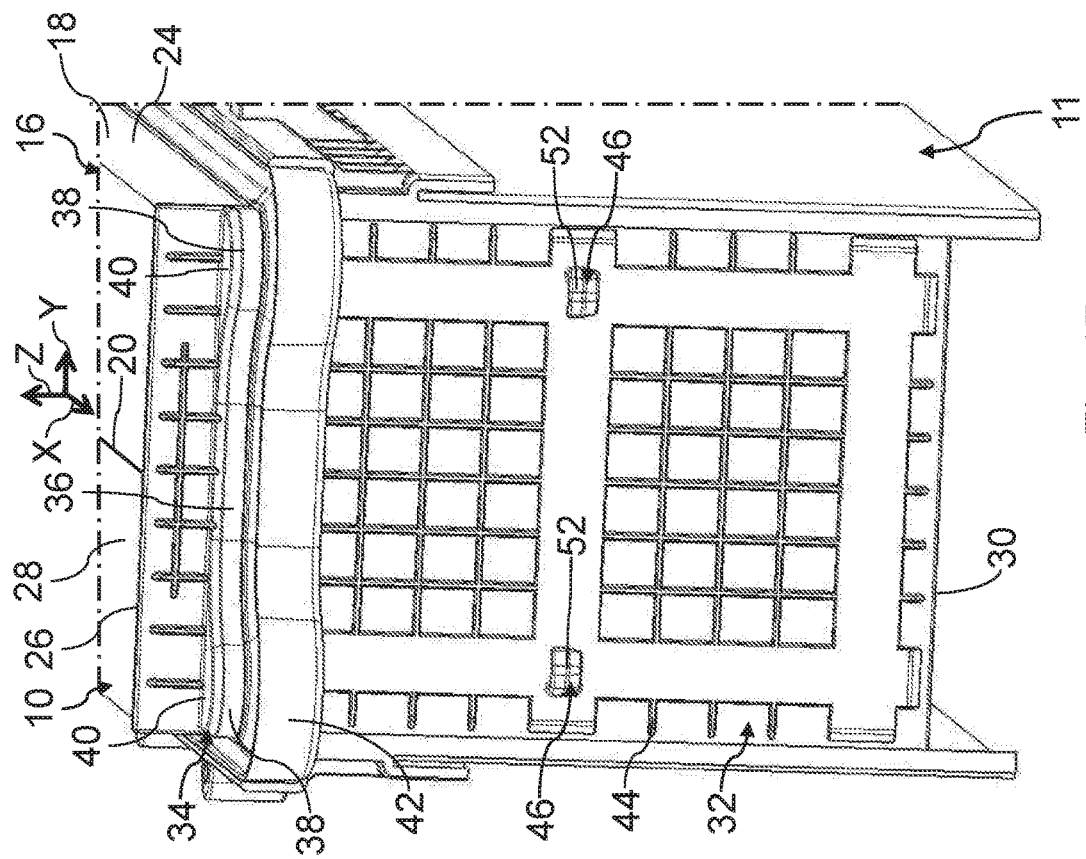
FIG. 17 shows an isometric diagram of a detail of an air filter with an air filter element according to a ninth exemplary embodiment which is similar to the air filter in FIGS. 15 and 16, with two alternative transverse retaining spring arms which are disposed centrally on the end disks and extend transversely to the installation direction.

FIGS. 17 and 18 show a ninth exemplary embodiment of a filter element 10. In contrast with the eighth exemplary embodiment in FIGS. 15 and 16, the retaining spring arms 850 are directed with the free ends toward one another on sides of one of the end disks 32.

Figure 20:
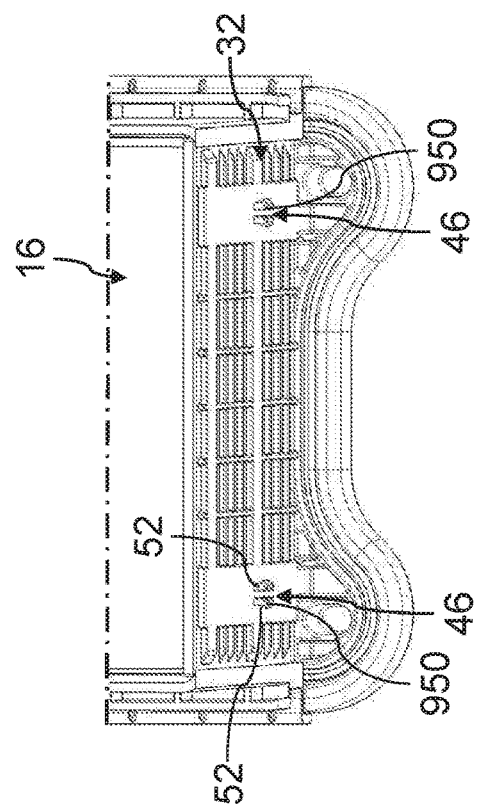
FIG. 20 shows a bottom view of the detail of the filter element in FIG. 19.
Figure 19:
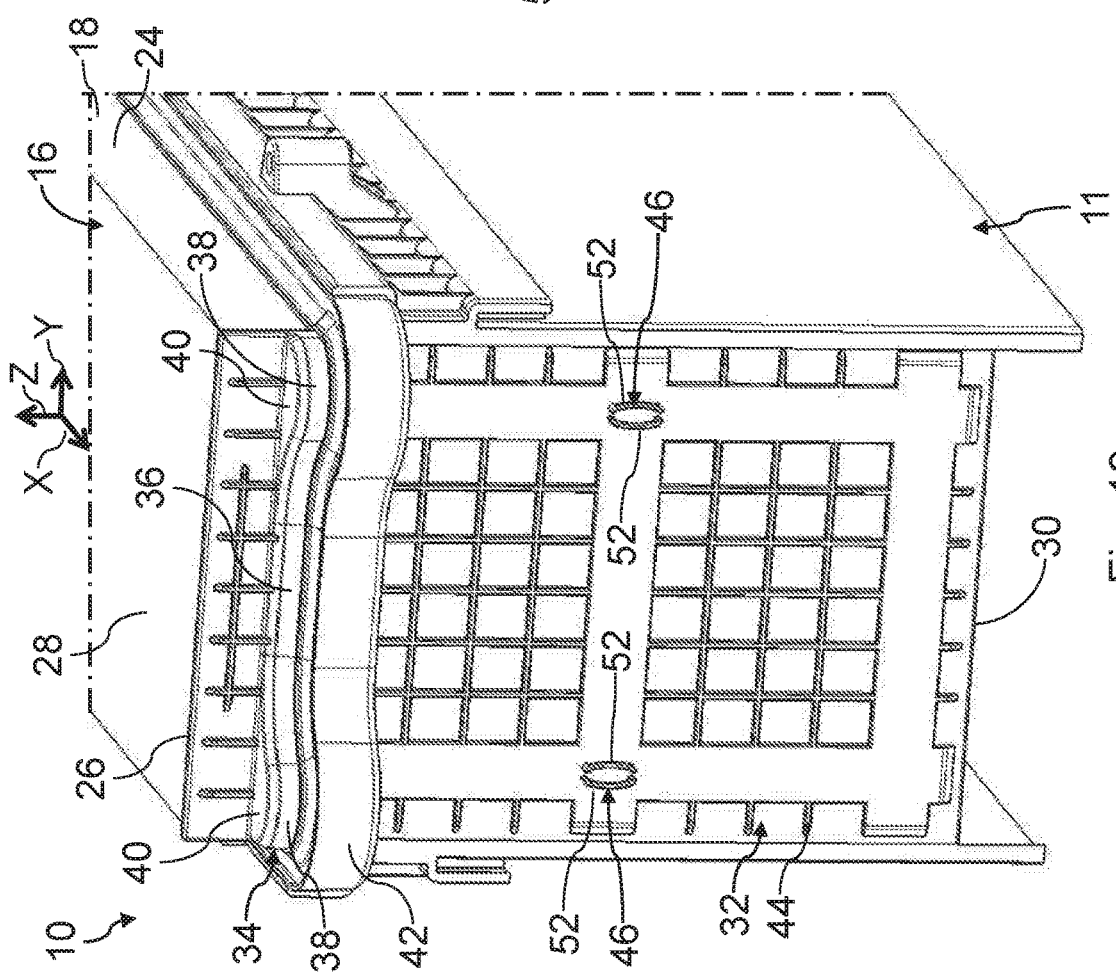
FIG. 19 shows an isometric diagram of a detail of an air filter with an air filter element according to a tenth exemplary embodiment, with two transverse retaining clamps which are disposed approximately centrally on the end disks with respect to the installation direction.

FIGS. 19 and 20 show a tenth exemplary embodiment of a spring element 10. As in the third exemplary embodiment from FIGS. 7 to 9, each of the transverse retaining configurations 46 here has an elastically resilient retaining clamp 950. The transverse retaining configurations 46 are disposed on the outside of the end disk 32, as seen in the direction of the z axis, approximately centrally between the border on the oncoming flow side and the border on the outgoing flow side. The transverse retaining configurations 46 with the corresponding longitudinal retaining configurations 38 are flush in the direction of the z axis in the vicinity of the same longitudinal side 24.

Each retaining clamp 950 has two retaining webs, each extending essentially in the direction of the z axis and in the direction of the x axis. The retaining webs are symmetrical with respect to an imaginary middle plane of the retaining clamp 950 which extends parallel to the X-Z plane. Each retaining web has a concave curvature, as seen from the other retaining web in the direction of the y axis. The ends of the retaining webs facing the oncoming flow side 28 and the outgoing flow side 30 are situated at the same height, as seen in the direction of the z axis and are at a distance from one another in the direction of the y axis. The retaining webs are elastically bendable in the direction of the y axis. The outsides of the retaining webs facing away from the other retaining web, respectively, in the direction of the y axis have transverse retaining surfaces 52. The transverse retaining surfaces 52 extend essentially in the direction of the x axis with a curve accordingly and in the direction of the z axis. The transverse retaining surfaces 52 are directed approximately in the direction of the y axis at their center.

The corresponding transverse retaining receptacles (not shown in FIGS. 19 and 20) on the sides of the filter housing 11 have corresponding transverse mating surfaces, which are directed essentially in the direction of the y axis.

With the filter element 10 assembled, the retaining webs of the retaining clamps 850 elastically grip the corresponding transverse retaining receptacles. The transverse retaining surfaces 52 of the retaining clamps 850 are each in contact with one of the transverse mating surfaces of the transverse retaining receptacles. The transverse retaining surfaces 52 are supported on the corresponding transverse mating surfaces in the direction of the y axis, i.e., transversely to or across the z axis and the element axis 14. The filter element 10 is positioned and secured there in the direction of the y axis. The transverse retaining surfaces 52 and the transverse mating surfaces are movable relative to one another in the direction of the z axis and in the direction of the x axis. Retention and/or guidance of the filter element 10 by means of the transverse retaining configurations 46 has/have extensive position tolerance of those in the X-Z plane.

Figure 21:
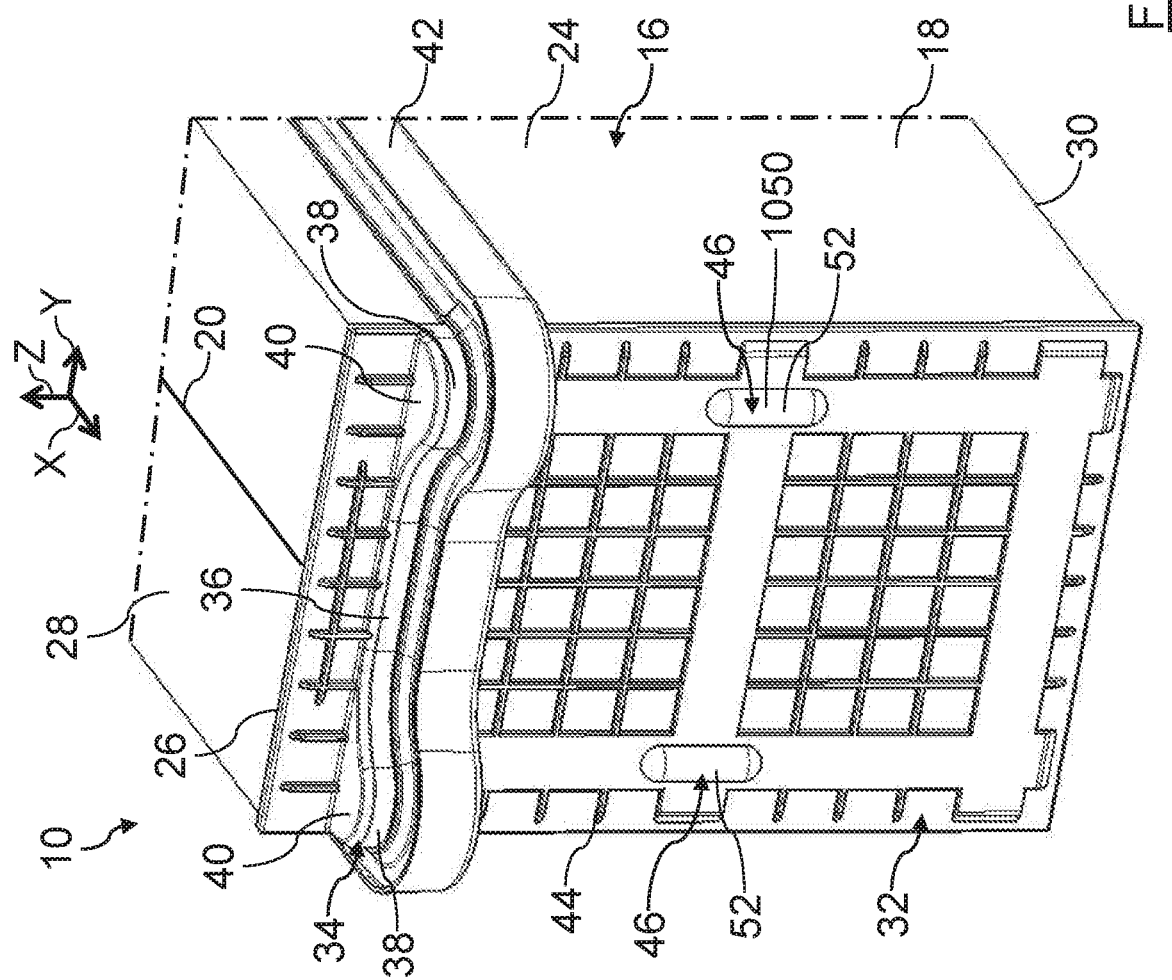
FIG. 21 shows an isometric diagram of an air filter element according to an eleventh exemplary embodiment, with two transverse retaining strips which are disposed approximately centrally on the end disks with respect to the installation direction.

FIG. 21 shows an air filter with a filter element 10 according to an eleventh exemplary embodiment. The eleventh exemplary embodiment differs from the tenth exemplary embodiment in FIGS. 19 and 20 in that the transverse retaining configurations 46 each have an elastic retaining strip 1050. The retaining strips 1050 are each approximately in the shape of a circular cylinder, which is divided in its length and whose base surfaces have a spherical rounding. An imaginary axis of the circular cylinder extends in parallel to the z axis and is situated on the side facing the end disk 32. The outer peripheral side of the retaining strip 1050 facing away from the filter body 16 forms the transverse retaining surface 52. The axis of the circular cylinder may be referred to as the bending axis of the curved transverse retaining surface 52.

The corresponding transverse retaining receptacles (not shown in FIG. 21) on the sides of the filter housing 11 have transverse mating surfaces corresponding to the transverse retaining surfaces 52. The transverse mating surfaces are curved according to the peripheral sides of the retaining strips 1050, so that they form a type of channel to receive the respective retaining strip 1050.

When the filter element 10 is assembled, the retaining strips 1050 engage elastically in the corresponding transverse retaining receptacles. The transverse retaining surfaces 52 are each in contact with one of the transverse mating surfaces of the transverse retaining receptacles. The transverse retaining surfaces 52 are supported on the corresponding transverse mating surfaces in the X-Y plane, i.e., transversely to or across the z axis and the element axis 14. The filter element 10 is positioned and secured there in the X-Y plane. In the direction of the z axis, the transverse retaining surfaces 52 and the transverse mating surfaces are movable relative to one another. Retention and/or guidance of the filter element 10 by means of the transverse retaining configurations 46 has/have position tolerance in the direction of the z axis. Due to the elasticity of the retaining strips 1050, a certain position tolerance is also achieved in the X-Y plane.

Figure 23:
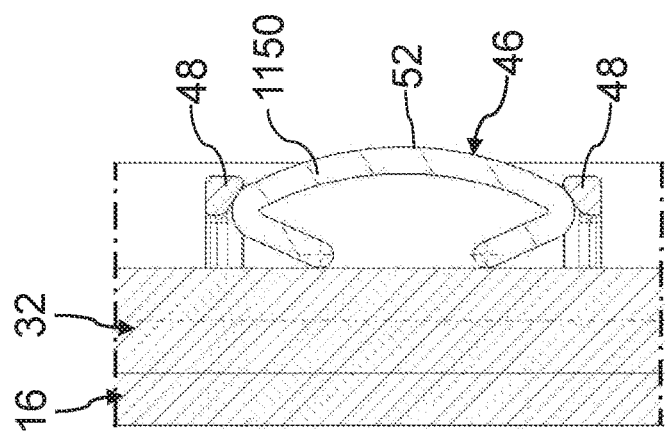
FIG. 23 shows a detail view of the filter element in FIG. 22 in the region of one of the retaining spring elements.
Figure 22:
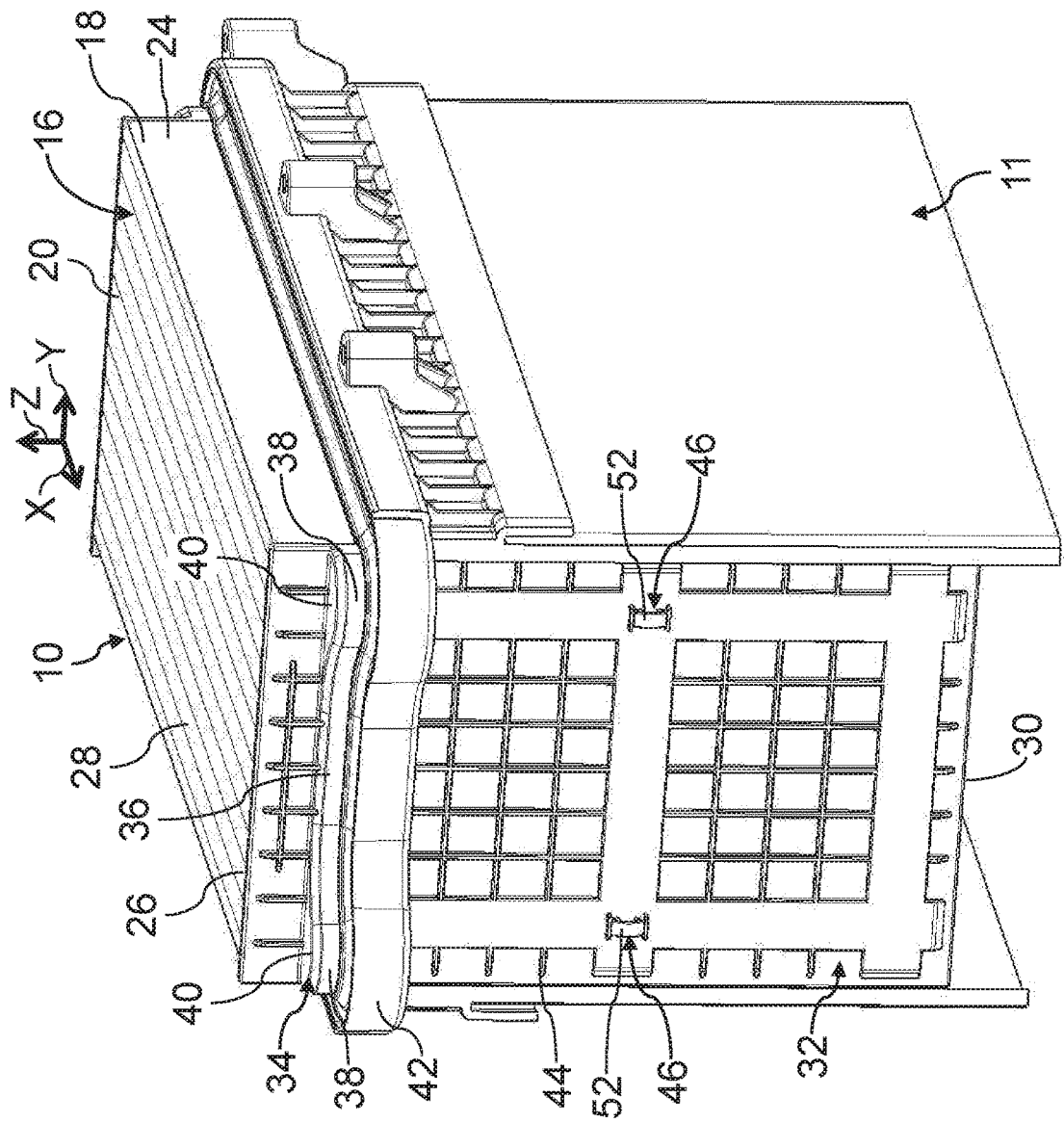
FIG. 22 shows an isometric diagram of a detail of an air filter with an air filter element according to a twelfth exemplary embodiment, with two transverse retaining spring elements made of metal which are disposed approximately centrally on the end disks with respect to the installation direction.

FIGS. 22 and 23 show an air filter with a filter element 10 according to a twelfth exemplary embodiment. In contrast with the eighth exemplary embodiment in FIGS. 15 and 16, the transverse retaining configurations 46 in the twelfth exemplary embodiment each have a retaining spring element 1150, which extends in the direction of the z axis. The retaining spring elements 1150 are curved plate springs, which are clamped between two retaining webs under an elastic spring prestress. The retaining spring elements 1150 are preferably made of a material having spring elasticity. The retaining webs are situated on opposite sides as seen in the direction of the z axis and are each connected in one piece to the end disk 32. The retaining spring elements 1150 protrude beyond the retaining webs each with a bulgy section in the direction of the x axis. The bulgy section forms the corresponding transverse retaining surfaces 52. At their center, the transverse retaining surfaces 52 are directed in the direction of the x axis.

With the assembled filter element 10, the retaining spring elements 1150 act elastically on the corresponding transverse retaining receptacles on the side of the filter housing 11. The transverse retaining surfaces 52 of the retaining spring elements 1150 are each in contact with a corresponding transverse mating surfaces of the transverse retaining receptacles. The transverse retaining surfaces 52 are supported on the corresponding transverse mating surfaces in the direction of the x axis, i.e., transversely to or across the z axis and the element axis 14. The filter element 10 is positioned and secured there in the direction of the x axis. The transverse retaining surfaces 52 and the transverse mating surfaces are movable relative to one another in the Y-Z plane. A retention and/or guidance of the filter element 10 by means of the transverse retaining configurations 46 has/have a position tolerance in the direction of the Y-Z plane.

Due to the elasticity of the retaining spring elements 1150, a certain position tolerance is also achieved in the direction of the x axis.

What is claimed is:

1. A filter element (10) configured for installation into an air filter housing (11), comprising:
   an filter body (16) of a filter medium (18), the filter body having
      an oncoming flow side (28) where fluid to be filtered enters the filter element; and
      an outgoing flow side (30) where fluid to be filtered exits the filter element and defining an element axis (14) extending through the filter element from the oncoming flow side (28) to the outgoing flow side (30),
   wherein, as used herein, axial is a direction parallel to the element axis and radial is a direction transverse to the element axis;
   the filter body comprising a plurality of radially outer longitudinal surfaces (24) of the filter body (16), the plurality of radially outer longitudinal surfaces extending axially from the oncoming flow side (28) of the filter body (16) to the outgoing flow side (30) of the filter body (16);
   wherein the filter element comprises:
      a first end disk (32) disposed on and connected to a first radially outer longitudinal surface of the plurality of radially outer longitudinal surfaces of the filter body (16), the first end disk arranged between the oncoming flow side (28) and the outgoing flow side (30);
      wherein the plurality of radially outer longitudinal surfaces of the filter body (16) include a pair of radially opposing outer longitudinal surfaces consisting of:
         a radially opposing outer longitudinal surface arranged at a first edge of the first radially outer longitudinal surface of the filter body (16); and
         a second opposing outer longitudinal surface of the filter body (16) arranged at an opposite second edge of the first radially outer longitudinal surface of the filter body (16);
      at least one longitudinal retaining configuration (38) connected to and extending axially across a radially outer surface of the first end disk, having:
         at least one longitudinal retaining surface (40) extending axially across a radially outer surface of the first end disk,
         wherein the at least one longitudinal retaining surface (40) is adapted to contact a corresponding longitudinal mating surface of the filter housing (11) when in an installed state in the filter housing, the at least one longitudinal retaining surface (40) supporting the filter element (10) in position axially; and
      a traverse retaining configuration (46) connected to the first end disk (32) and spaced axially away from the at least one longitudinal retaining configuration (38), the traverse retaining configuration (46) including:
         at least one transverse retaining fork (250), each have a first leg (52) and a second leg (52), the first and second legs spaced apart in a radial direction transverse to the element axis forming a gap therebetween, the first leg (52) and the second leg (52) projecting radially outwardly from the first end disk, wherein the at least one transverse retaining fork is configured to receive and engage a transverse retaining receptacle (54) of the filter housing into the gap between the first and second legs, wherein in the installed state, the at least one retaining fork (250) fixes a position of the filter element (10) in the housing (11) in a direction traverse to the element axis (14).

2. The filter element according to claim 1, wherein the at least one transverse retaining fork (250) is spaced away from the at least one longitudinal retaining surface (40) in an axial direction.

3. The filter element according to claim 1, wherein the at least one transverse retaining fork (250) has a portion that is of an elastically deformable material such that the first end the second legs are variable elastically in position relative to the filter body (16).

4. The filter element according to claim 1, wherein at least one of the transverse retaining fork (250) and at least one of the longitudinal retaining surfaces (40) is disposed in the proximate to opposing end sides (28, 30) of the filter element (10) axially with respect to the element axis (14), in the installation direction (12).

5. The filter element according to claim 1, wherein the at least one longitudinal retaining configuration with the at least one of the transverse retaining fork (250) is formed on and together with the at least one end disk (32) as a one piece unitary component.

6. The filter element according to claim 1, wherein the at least one longitudinal retaining configuration extends circumferentially and closes around the filter body on peripheral sides of the filter body.

7. The filter element according to claim 1, wherein the first and second legs (52) of the at least one retaining fork (250) have a first end fixed to an outer surface of the first end disk (32) and projecting radially outwardly away from the filter body.

8. An air filter for filtering a fluid, comprising:
a filter housing (11), including
at least one inlet for the fluid; and
at least one outlet for the fluid;
at least one filter element (10) according to claim 1, wherein
the at least one filter element is a flat filter element having open filter body (16) made of a filter medium (18) which has an oncoming flow side (28) and an outgoing flow side (30) for the fluid to be filtered;
wherein the at least one filter element (10) is disposed inside the filter housing (11) and separates the at least one inlet from the at least one outlet;

wherein the filter housing further includes
at least one transverse retaining receptacle (54) provided in an inner wall of the filter housing, the at least one transverse retaining receptacle received into the gap between the first and second legs and engaging with the at least one retaining fork of the filter element, fixing a position of the filter element (10) in the filter housing (11) in a direction traverse to the element axis (14);
a corresponding longitudinal mating surface against which the at least one longitudinal retaining surface (40) of the filter element contacts, which is directed with at least one direction component axially to an element axis (14) of the filter element (10) and which is in contacts, retaining the filter element (10) axially in the filter housing.

9. A filter housing (11) of a filter for fluid, which has at least one inlet and at least one outlet for fluid and in which at least one filter element (10) according to claim 1 is installed, wherein the filter element is a flat filter element, is disposed and separates the at least one inlet from the at least one outlet; and wherein the filter housing (11) has at least one longitudinal mating surface with respect to a housing axis (14), said mating surface being directed with at least one direction component axially to the housing axis (14) and adapted to contact a corresponding longitudinal mating surface (40) of the filter element (10) for securing the filter element (10) axially to the housing axis (14);

wherein the filter housing (11) comprises at least one transverse mating surface (56) which is directed with at least one direction component transversely to the housing axis (14) which is separated from the at least one longitudinal mating surface, the at least one transverse mating surface (56) adapted to contact with a corresponding transverse mating surface (52) of the filter element (10) for securing the filter element (10) across the housing axis (14).

10. The filter element according to claim 1, wherein the at least one transverse retaining fork (250),is at least two transverse retaining forks (250);

wherein a first transverse retaining fork (250) of the at least two transverse retaining forks (250) is arranged proximate to the first edge of the first radially outer longitudinal surface of the filter body (16) and spaced further away from the opposite second edge of the first radially outer longitudinal surface of the filter body (16);

wherein a second transverse retaining fork (250) of the at least two transverse retaining forks (250) is arranged proximate to the opposite second edge of the first radially outer longitudinal surface of the filter body (16) and spaced further away from the first edge of the first radially outer longitudinal surface of the filter body (16).

\* \* \* \* \*